United States Patent
Aiura et al.

(10) Patent No.: US 9,448,740 B2
(45) Date of Patent: Sep. 20, 2016

(54) STORAGE APPARATUS AND HIERARCHY CONTROL METHOD

(71) Applicant: Hitachi, Ltd., Tokyo (JP)

(72) Inventors: Hiromichi Aiura, Yokohama (JP); Hiroshi Koizumi, Odawara (JP)

(73) Assignee: HITACHI, LTD., Tokyo (JP)

( * ) Notice: Subject to any disclaimer, the term of this patent is extended or adjusted under 35 U.S.C. 154(b) by 346 days.

(21) Appl. No.: 13/978,819

(22) PCT Filed: Nov. 27, 2012

(86) PCT No.: PCT/JP2012/080651
§ 371 (c)(1),
(2) Date: Jul. 9, 2013

(87) PCT Pub. No.: WO2014/083620
PCT Pub. Date: Jun. 5, 2014

(65) Prior Publication Data
US 2014/0297909 A1    Oct. 2, 2014

(51) Int. Cl.
*G06F 13/12* (2006.01)
*G06F 13/38* (2006.01)
*G06F 3/06* (2006.01)

(52) U.S. Cl.
CPC ............. *G06F 3/0647* (2013.01); *G06F 3/061* (2013.01); *G06F 3/067* (2013.01); *G06F 3/0608* (2013.01); *G06F 3/0631* (2013.01); *G06F 3/0665* (2013.01); *G06F 3/0689* (2013.01)

(58) Field of Classification Search
None
See application file for complete search history.

(56) References Cited

U.S. PATENT DOCUMENTS

| | | | | |
|---|---|---|---|---|
| 5,623,693 | A * | 4/1997 | Ashton | G06F 3/0601 710/39 |
| 7,246,105 | B2 * | 7/2007 | Numanoi | G06F 3/061 |
| 7,567,188 | B1 * | 7/2009 | Anglin | G06F 3/0608 341/63 |
| 2002/0152335 | A1 * | 10/2002 | Holm et al. | 710/8 |
| 2006/0010169 | A1 * | 1/2006 | Kitamura | 707/200 |
| 2006/0129743 | A1 * | 6/2006 | Herrell et al. | 711/100 |
| 2006/0242330 | A1 * | 10/2006 | Torudbakken et al. | 710/5 |
| 2007/0208788 | A1 * | 9/2007 | Chakravarty | G06F 11/1451 |
| 2008/0117909 | A1 * | 5/2008 | Johnson | 370/392 |
| 2009/0299973 | A1 * | 12/2009 | Kataoka | G06F 17/30132 |
| 2011/0066802 | A1 * | 3/2011 | Kawaguchi | 711/114 |

(Continued)

FOREIGN PATENT DOCUMENTS

WO    WO 2012/020471 A1    2/2012

OTHER PUBLICATIONS

PCT International Search Report and Written Opinion on application PCT/JP2012/080651 mailed Jan. 15, 2013; 8 pages.

*Primary Examiner* — Henry Tsai
*Assistant Examiner* — Christopher Bartels
(74) *Attorney, Agent, or Firm* — Foley & Lardner LLP

(57) ABSTRACT

Proposed are a storage apparatus and a hierarchy control method capable of reducing the workload of system operation and the workload of performance investigation.
An access frequency of each of a plurality of measurement cycles for each unit area in a virtual volume is measured in a storage apparatus loaded with a hierarchy control function, the storage hierarchy which is proper as a placement destination of data written in each of the unit areas of the virtual volume is determined based on a measurement result, and the data written in a necessary unit area in the virtual volume is relocated to the storage area to which belongs the storage hierarchy that was determined as being proper based on a determination result.

15 Claims, 15 Drawing Sheets

(56) References Cited

U.S. PATENT DOCUMENTS

| | | | | |
|---|---|---|---|---|
| 2011/0072233 A1* | 3/2011 | Dawkins | ............ | G06F 3/061 711/206 |
| 2011/0145528 A1* | 6/2011 | Watanabe | ............ | G06F 3/0605 711/162 |
| 2011/0167221 A1* | 7/2011 | Pangal | ............ | G06F 11/1453 711/117 |
| 2011/0167236 A1 | 7/2011 | Orikasa et al. | | |
| 2011/0191558 A1* | 8/2011 | Anderson | ............ | G06F 12/16 711/162 |
| 2012/0042124 A1 | 2/2012 | Miyamoto et al. | | |
| 2012/0246386 A1 | 9/2012 | Akutsu et al. | | |
| 2013/0080696 A1* | 3/2013 | Bert | ............ | G06F 12/0866 711/113 |
| 2014/0325121 A1* | 10/2014 | Akutsu | ............ | G06F 3/0604 711/103 |

\* cited by examiner

FIG.7

| ACCESS FREQUENCY (Ix) OF IMMEDIATE X TIME | ACCESS FREQUENCY (Iy) OF IMMEDIATE Y TIME | HIERARCHY/ ATTRIBUTE |
|---|---|---|
| $Ix \geq Ia$ | $Iy \geq Iam$ | H2 |
| | $Iam > Iy$ | M3 |
| $Ia > Ix \geq Ib$ | $Iy \geq Iah$ | H3 |
| | $Iah > Iy \geq Ibl$ | M2 |
| | $Ibl > Iy$ | L3 |
| $Ib > Ix$ | $Iy \geq Ibm$ | M3 |
| | $Ibm > Iy$ | L2 |

FIG.8

| CURRENT HIERARCHY/ ATTRIBUTE | ACCESS FREQUENCY (Iz) OF IMMEDIATE Z TIME | HIERARCHY/ ATTRIBUTE |
|---|---|---|
| H3 | $Iz \geq Iah$ | H2 |
| | $Iah > Iz$ | M2 |
| M3 | $Iz \geq Iam$ | H2 |
| | $Iam > Iz \geq Ibm$ | M2 |
| | $Ibm > Iz$ | L2 |
| L3 | $Iz \geq Ibl$ | M2 |
| | $Ibl > Iz$ | L2 |

FIG. 9

| Pool | CAPACITY | PAGE | LUN | ASSIGN-MENT | HIERARCHY ATTRIBUTE | Ix | Iy | Iz | HIERARCHY FIXATION | CORRESPONDING PHYSICAL PAGE |
|---|---|---|---|---|---|---|---|---|---|---|
| 0 | 8.6TB | 0 | 0000 | ASSIGNED | H2 | 220 | 240 | 233 | NONE | 0 |
| | | 1 | 0001 | ASSIGNED | H1 | 190 | 211 | 205 | H1 | 10 |
| | | 2 | 1001 | ASSIGNED | H3 | 140 | 203 | 197 | NONE | 50 |
| | | ... | ... | ... | ... | ... | ... | ... | ... | ... |
| | | 520 | 4000 | ASSIGNED | M1 | 120 | 131 | 128 | M1 | 100 |
| | | 521 | 4000 | ASSIGNED | M1 | 130 | 141 | 139 | M1 | 101 |
| | | 522 | 0000 | ASSIGNED | M2 | 93 | 120 | 115 | NONE | 110 |
| | | ... | ... | ... | ... | ... | ... | ... | ... | ... |
| | | 1350 | 2000 | ASSIGNED | L1 | 10 | 8 | 12 | L1 | 1000 |
| | | 1351 | 1000 | ASSIGNED | L3 | 92 | 34 | 40 | NONE | 1050 |
| | | 1352 | 4001 | NOT ASSIGNED | L2 | 20 | 21 | 22 | NONE | — |
| | | 1353 | NOT ASSIGNED | NOT ASSIGNED | NOT ASSIGNED | NOT ASSIGNED | NOT ASSIGNED | NOT ASSIGNED | NONE | — |
| | | ... | ... | ... | ... | ... | ... | ... | ... | ... |
| ... | ... | | | | | | | | | |

| | | 41C | | 41D | | |
|---|---|---|---|---|---|---|
| 41A | 41B | RAID LEVEL | | STORAGE DEVICE TYPE | | 41E |
| HIERARCHY/ATTRIBUTE | RAID Gr | LEVEL | CONFIGU-RATION | TYPE | CAPACITY | Emu Type |
| H1 | 1-1 | RAID5 | 3D+1P | SSD | 200GB | openV |
| | 1-2 | RAID5 | 3D+1P | SSD | 200GB | openV |
| H2 | 1-3 | RAID5 | 3D+1P | SSD | 400GB | openV |
| | 1-4 | RAID5 | 3D+1P | SSD | 400GB | openV |
| H3 | 1-5 | RAID5 | 3D+1P | SSD | 200GB | openV |
| M1 | 1-6 | RAID1+0 | 2D+2P | SAS | 300GB | openV |
| | 1-7 | RAID1+0 | 2D+2P | SAS | 300GB | openV |
| | 1-8 | RAID1+0 | 2D+2P | SAS | 300GB | openV |
| M2 | 1-9 | RAID1+0 | 4D+4P | SAS | 300GB | openV |
| | 1-10 | RAID1+0 | 4D+4P | SAS | 300GB | openV |
| | 1-11 | RAID1+0 | 4D+4P | SAS | 300GB | openV |
| | 1-12 | RAID1+0 | 4D+4P | SAS | 300GB | openV |
| | 1-13 | RAID1+0 | 4D+4P | SAS | 300GB | openV |
| M3 | 1-14 | RAID5 | 3D+1P | SAS | 600GB | openV |
| | 1-15 | RAID5 | 3D+1P | SAS | 600GB | openV |
| | 1-16 | RAID5 | 3D+1P | SAS | 600GB | openV |
| L1 | 1-17 | RAID6 | 6D+2P | SATA | 3000GB | openV |
| | 1-18 | RAID6 | 6D+2P | SATA | 3000GB | openV |
| | 1-19 | RAID6 | 6D+2P | SATA | 3000GB | openV |
| L2 | 1-20 | RAID6 | 6D+2P | SATA | 3000GB | openV |
| | 1-21 | RAID6 | 6D+2P | SATA | 3000GB | openV |
| | 1-22 | RAID6 | 6D+2P | SATA | 3000GB | openV |
| | 1-23 | RAID6 | 6D+2P | SATA | 3000GB | openV |
| | 1-24 | RAID6 | 6D+2P | SATA | 3000GB | openV |
| L3 | 1-25 | RAID6 | 6D+2P | SATA | 3000GB | openV |
| | 1-26 | RAID6 | 6D+2P | SATA | 3000GB | openV |
| | 1-27 | RAID6 | 6D+2P | SATA | 3000GB | openV |

41CA   41CB   41DA   41DB

41

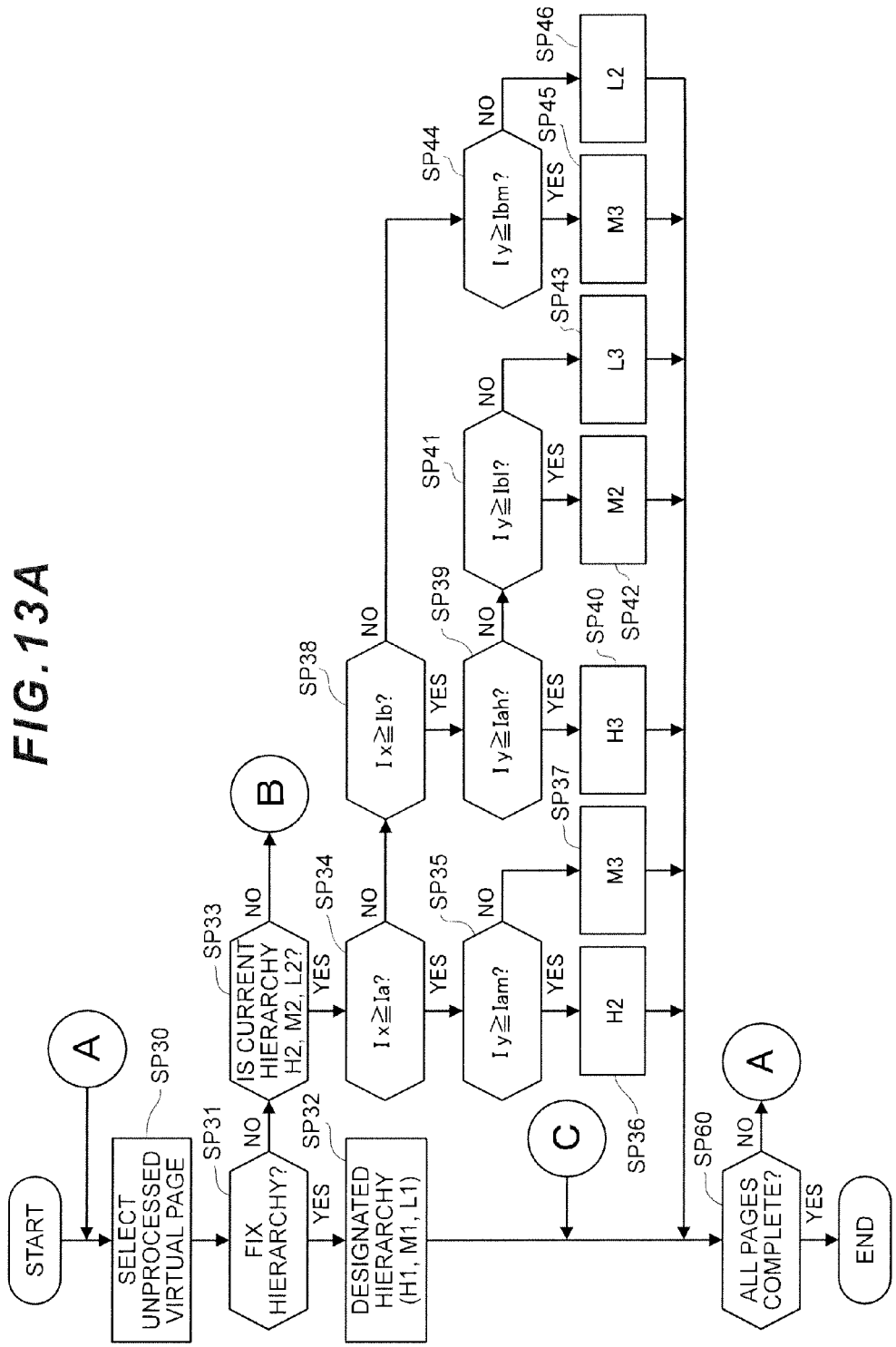

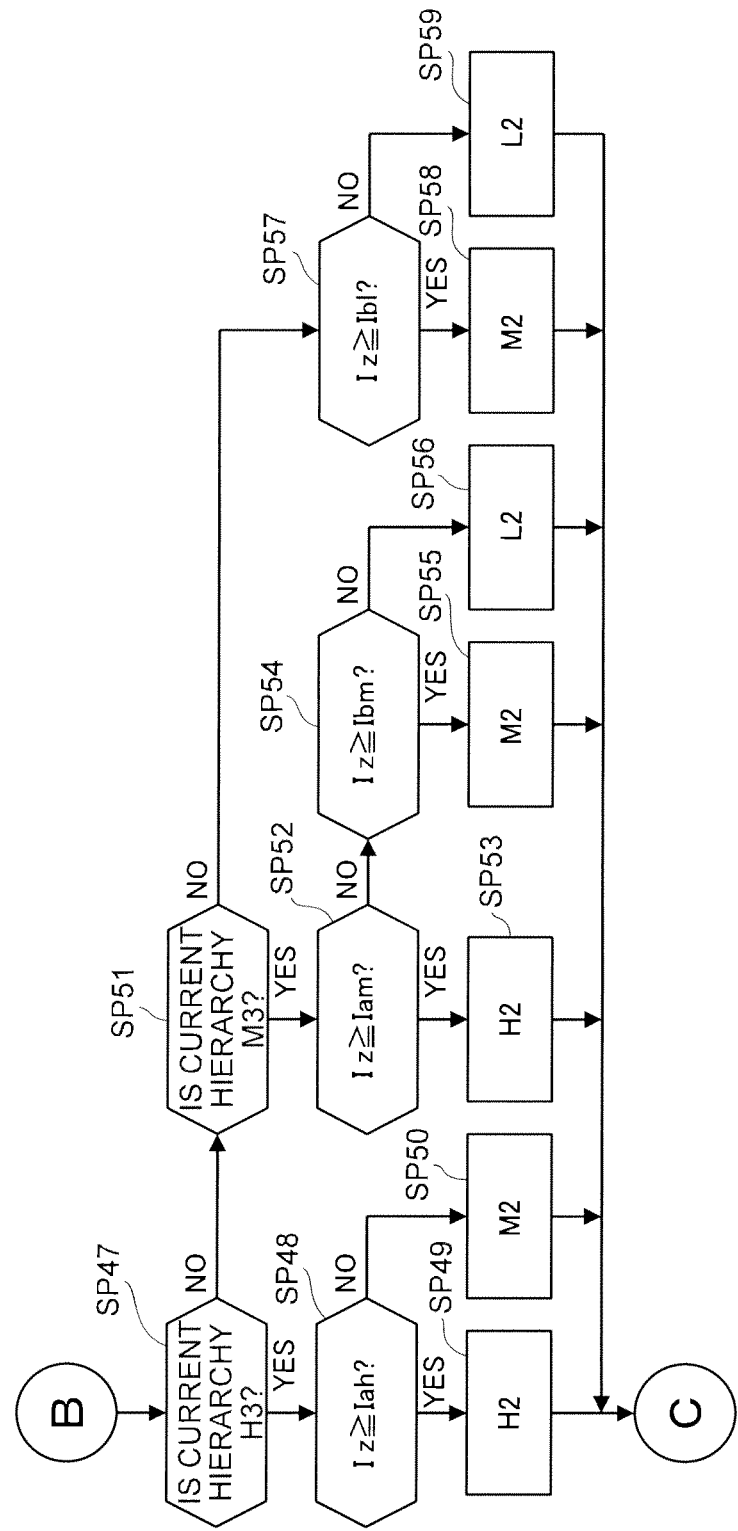

STORAGE APPARATUS AND HIERARCHY CONTROL METHOD

TECHNICAL FIELD

The present invention relates to a storage apparatus and a hierarchy control method and can be suitably applied, for instance, to a storage apparatus that is equipped with a hierarchy control function.

BACKGROUND ART

Conventionally, the Thin Provisioning function has been proposed as one function of a storage apparatus, and put into practical application. The Thin Provisioning function is a function of presenting, to a higher-level device (host computer), a virtual volume (this is hereinafter referred to as the "virtual volume") as a logical volume to be used for the reading and writing of user data, and dynamically assigning, to the virtual volume, a physical storage area for actually storing the user data in accordance with the status of use of that virtual volume.

For all practical purposes, in a storage apparatus that is equipped with the Thin Provisioning function, the inside of the virtual volume is managed by being divided into a plurality of unit areas (these are hereinafter referred to as the "virtual pages") of a predetermined size, and a storage area provided by a storage device mounted in the storage apparatus is managed as an aggregate of one or more logical storage areas referred to as pools.

Here, the storage area in the pool is managed by being divided into areas (these are hereinafter referred to as the "logical pages") of the same size as the virtual pages. Moreover, the physical storage area provided by the storage device is also managed by being divided into areas (these are hereinafter referred to as the "physical pages") of the same size as the logical pages. In addition, associated with each of these logical pages are respectively different physical pages in a manner of one-to-many, many-to-many, or many-to-one.

In addition, when the storage apparatus receives, from the higher-level device, a write request for writing data in a virtual page in a virtual volume to which a storage area has not yet been assigned, the storage apparatus assigns a logical page to that virtual page from a pool, and stores the write-target data in a physical page that is associated with that logical page.

According to this kind of Thin Provisioning function, there is an advantage in that the storage area in the storage apparatus can be efficiently used while presenting, to the host apparatus, a volume of a capacity that is greater than the storage area in the storage apparatus.

Moreover, in recent years, as technology that is related to the Thin Provisioning function, also proposed is a function of configuring one pool with storage areas respectively provided by a plurality of types of storage devices having different performances, measuring an access frequency in virtual page units of the virtual volume, relocating data written in a virtual page with a high access frequency to a storage area provided by a storage device with a higher performance, and relocating data written in a virtual page with a low access frequency to a storage area provided by a storage device with a lower performance (this is hereinafter referred to as the "hierarchy control function") (refer to PTL 1).

Moreover, PTL 2 below discloses the placement of pages based on the weighted average of the respective I/O counts of a first cycle and a second cycle.

CITATION LIST

Patent Literature

[PTL 1]
 Specification of U.S. Patent Application Publication No. 2011/0167236
[PTL 2]
 Specification of U.S. Patent Application Publication No. 2012/0246386

SUMMARY OF INVENTION

Technical Problem

However, with PTL 1 above, the access frequency of each virtual page in the virtual volume is measured for each one given period of time, and the relocation destination is determined based only on the measured access frequency.

Thus, there is a problem in that a virtual page, in which the access frequency of the overall measurement cycle became high as a result of the access frequency of only a certain period in the cycle of measuring the access frequency (this is hereinafter referred to as the "measurement cycle") being high, is also placed in a storage area with a high performance even during a period in which the access frequency in the measurement cycle is not high.

In the foregoing case, a high performance storage area for which cost is high and preparation of a large capacity is difficult will be occupied by data with a high access frequency only during a certain period of the measurement cycle. Due to the occurrence of this kind of event, data which should originally have been placed in a high performance storage area cannot be placed in a high performance storage area, and there is a possibility that the reply performance demanded in the storage apparatus cannot be exhibited.

Moreover, when the reply performance demanded in the storage apparatus cannot be exhibited as described above, maintenance and performance investigation become necessary, and there is a problem in that the system operation load will increase by that much.

Moreover, with PTL 2 above, the I/O count is calculated based on past monitor results, and there is a problem in that it is not possible to deal with the increase in the I/O count in an immediate and short span.

Accordingly, if it is possible to place data to a more appropriate storage hierarchy without requiring any conscious effort on the part of a system operator even with data that is written in a virtual page with a temporarily high frequency in a storage apparatus equipped with the foregoing hierarchy control function, it should be possible to prevent the workload of system operation from increasing while preventing the deterioration of system performance.

The present invention was devised in view of the foregoing points, and an object of this invention is to propose a storage apparatus and a hierarchy control method capable of preventing the workload of system operation from increasing while preventing the deterioration of system performance.

Solution to Problem

The present invention for achieving the foregoing object provides a storage apparatus which provides a virtual volume to a higher-level device, manages the virtual volume by internally dividing the virtual volume into unit areas of a predetermined size, assigns a storage area to the corresponding unit area in the virtual volume according to a write request from the higher-level device for writing data into the virtual volume, and stores the write-target data in the storage area. The storage area is configured from a plurality of storage hierarchies respectively having different performances. The storage apparatus is provided with an access frequency measurement unit for measuring an access frequency of each of a plurality of measurement cycles for each of the unit areas in the virtual volume, a hierarchy determination unit for determining, based on a measurement result of the access frequency measurement unit, the storage hierarchy which is proper as a placement destination of the data written in each of the unit areas of the virtual volume, and a relocation unit for relocating, with respect to the unit area among each of the unit areas of the virtual volume in which the storage hierarchy to which belongs the storage area storing the data written in that unit area differs from the storage hierarchy that was determined as being proper as the placement destination of that data by the hierarchy determination unit, the data written in that unit area to the storage area to which belongs the storage hierarchy that was determined as being proper by the hierarchy determination unit.

The present invention additionally provides a hierarchy control method in a storage apparatus which provides a virtual volume to a higher-level device, manages the virtual volume by internally dividing the virtual volume into unit areas of a predetermined size, assigns a storage area to the corresponding unit area in the virtual volume according to a write request from the higher-level device for writing data into the virtual volume, and stores the write-target data in the storage area. The storage area is configured from a plurality of storage hierarchies respectively having different performances. The hierarchy control method is provided with a first step of measuring an access frequency of each of a plurality of measurement cycles for each of the unit areas in the virtual volume, a second step of determining, based on a measurement result, the storage hierarchy which is proper as a placement destination of the data written in each of the unit areas of the virtual volume, and a third step of relocating, with respect to the unit area among each of the unit areas of the virtual volume in which the storage hierarchy to which belongs the storage area storing the data written in that unit area differs from the storage hierarchy that was determined as being proper as the placement destination of that data by the hierarchy determination unit, the data written in that unit area to the storage area to which belongs the storage hierarchy that was determined as being proper.

According to the storage apparatus and the hierarchy control method of the present invention, it is possible to determine the storage hierarchy of the placement destination of data from the perspective a plurality of periods such as a long-term perspective, a medium-term perspective, and a short-term perspective. Accordingly, data can be placed to a more appropriate storage hierarchy without requiring any conscious effort on the part of a system operator.

Advantageous Effects of Invention

According to the present invention, it is possible to realize a storage apparatus and a hierarchy control method capable of preventing the workload of system operation from increasing while preventing the deterioration of system performance.

BRIEF DESCRIPTION OF DRAWINGS

FIG. 7 is a chart explaining the relation of the IOPS in the immediate first and second time cycles, and the proper storage hierarchy and area attribute.

FIG. 8 is a chart explaining the relation of the IOPS in the current storage hierarchy and immediate third time cycle, and the proper storage hierarchy and area attribute.

FIG. 9 is a conceptual diagram showing the configuration of the page management table.

FIG. 10 is a conceptual diagram showing the configuration of the hierarchy management table.

FIG. 13A is a flowchart showing the processing routine of the proper hierarchy determination processing.

FIG. 13B is a flowchart showing the processing routine of the proper hierarchy determination processing.

DESCRIPTION OF EMBODIMENTS

One embodiment of the present invention is now explained in detail with reference to the drawings.

(1) Configuration of Computer System in this Embodiment

Figure 1:
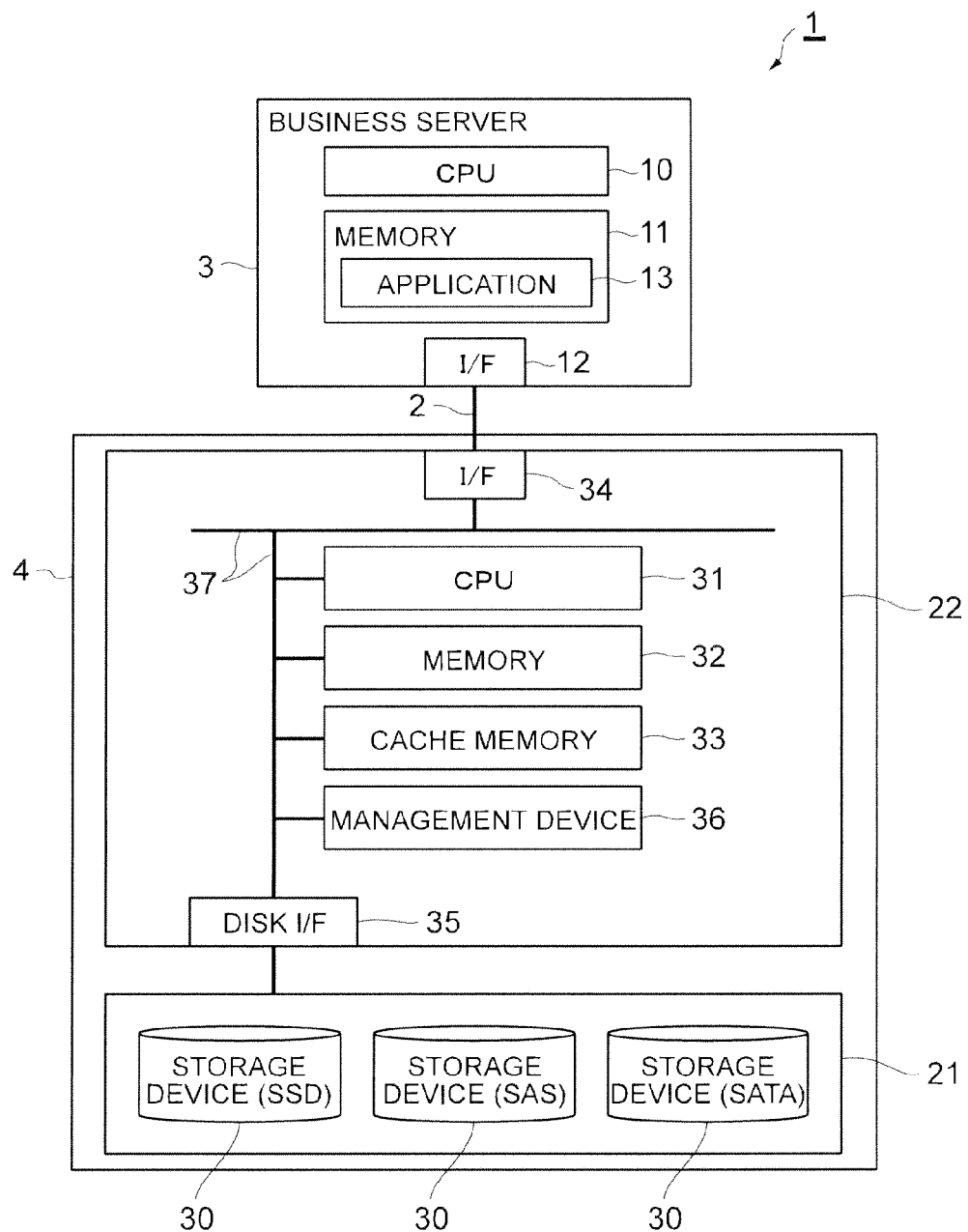
FIG. 1 is a block diagram showing the overall configuration of the computer system according to this embodiment.

In FIG. 1, 1 indicates the overall computer system of this embodiment. The computer system 1 is configured from one or more business servers 3 connected via a network 2, and a storage apparatus 4.

The network 2 is configured, for example, from a SAN (Storage Area Network), a LAN (Local Area Network), internet, a public line or a dedicated line. Communication between the business server 3 and the storage apparatus 4 via the network 2 is conducted, for example, according to a fibre channel protocol when the network 2 is a SAN, and according to a TCP/IP (Transmission Control Protocol/Internet Protocol) when the network 2 is a LAN.

The business server 3 is a server device for reading and writing data from and to the storage apparatus 4, and configured by comprising information processing resources such as a CPU 10, a memory 11 and an interface 12.

The CPU 10 is a processor that governs the operational control of the overall business server 3, and the memory 11 is mainly used for storing various programs such as an application 13. As a result of the CPU 10 executing the programs stored in the memory 11, the various types of processing such as the reading and writing of data from and to the storage apparatus 4 are executed. The interface 12 is configured, for example, from an NIC (Network Interface Card), and executes processing such as protocol conversion or the like during communication with the storage apparatus 4.

The storage apparatus 4 comprises a storage unit 21 for storing data, and a controller 22 for controlling the I/O of data to and from the storage unit 21.

The storage unit 21 is configured by comprising a plurality of types of storage devices 30 with different performances such as an SSD (Solid State Drive), a SAS (Serial Attached SCSI) disk and a SATA (Serial AT Attachment) disk. Among these plurality of types of storage devices 30, one or more logical volumes VOL (refer to FIG. 2) are set on the storage area provided by the plurality of storage devices 30 of the same type.

The controller 22 comprises a CPU (Central Processing Unit) 31, a memory 32, a cache memory 33, a host interface 34, a disk interface 35 and a management device 36, and configured by the foregoing components being mutually connected via an internal bus 37.

The CPU 31 is a processor that governs the operational control of the overall storage apparatus 4. Moreover, the memory 32 is mainly used for storing various programs and various data. As a result of the CPU 31 executing the programs stored in the memory 32, the storage apparatus 4 in its entirety executes the various types of processing as described later. The cache memory 33 is used for temporarily storing and retaining data to be read from and written in the storage device 30.

The host interface 34 is an interface to the network 2, and is configured, for example, from an NIC. The CPU 31 sends and receives read data or write data and various commands such as a read command or a write command to and from the business server 3 via the host interface 34.

The disk interface 35 is an interface to the storage device 30. The disk interface 35 reads and writes read data and write data from and to an address location designated in the read command or the write command by controlling the corresponding storage device 30 according to the read command or the write command from the business server 3 given via the host interface 34.

The management device 36 includes a display device (not shown) configured from a liquid crystal panel or the like, and an input device (not shown) configured from a keyboard, a mouse and the like, and is configured, for example, from a laptop personal computer. The management device 36 is used for the maintenance and management of the storage apparatus 4.

Figure 2:
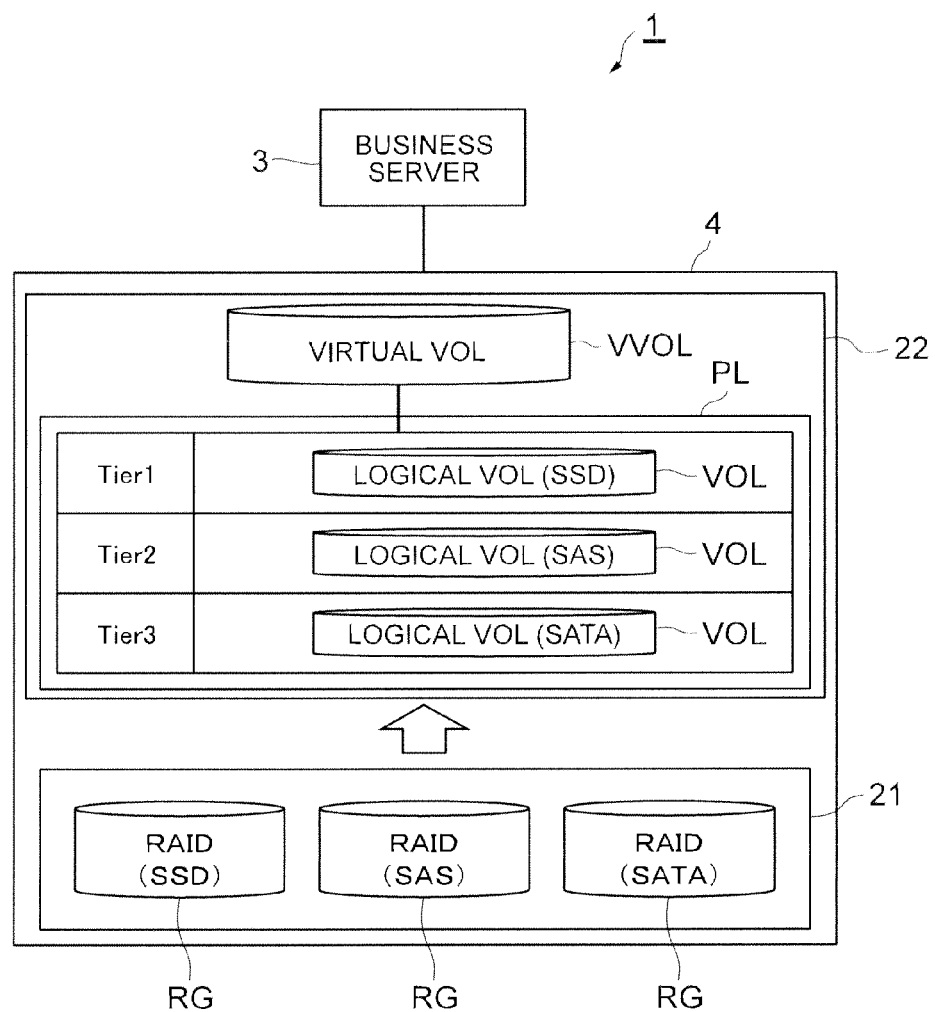
FIG. 2 is a conceptual diagram explaining the logical configuration of the storage areas in the computer system.

FIG. 2 shows the logical configuration of the storage areas in the storage apparatus 4. In the storage apparatus 4, the controller 22 manages the same type of one or more storage devices 30 as one RAID (Redundant Arrays of Independent Disks) group RG. In addition, one or more logical volumes VOL are created on the physical storage area provided by the respective storage devices 30 configuring the one RAID group RG.

Moreover, the controller 22 manages, as a first storage hierarchy ("Tier 1"), the storage area (logical volume VOL) provided by the RAID group RG that is configured from the storage devices 30 (hereinafter referred to as the "SSD (Solid State Disks)") with the highest performance among the storage devices 30 mounted in the storage apparatus 4. Similarly, the controller 22 manages, as a second storage hierarchy ("Tier 2"), the storage area (logical volume VOL) provided by the RAID group RG that is configured from the storage devices 30 (hereinafter referred to as the "SAS disks") with the next highest performance among the storage devices 30 mounted in the storage apparatus 4, and manages, as a third storage hierarchy ("Tier 3"), the storage area (logical volume VOL) provided by the RAID group RG that is configured from the storage devices 30 (hereinafter referred to as the "SATA disks") with the lowest performance among the storage devices 30 mounted in the storage apparatus 4.

In addition, the controller 22 manages, as a pool PL, the plurality of types of logical volumes VOL belonging to each of the first to third storage hierarchies. In other words, one pool PL is configured from one or more logical volumes VOL belonging to the first storage hierarchy, one or more logical volumes VOL belonging to the second storage hierarchy, and one or more logical volumes VOL belonging to the third storage hierarchy. Moreover, one or more virtual volumes VVOL are created on the pool PL, and these virtual volumes VVOL are provided to the business server 3.

Figure 3:
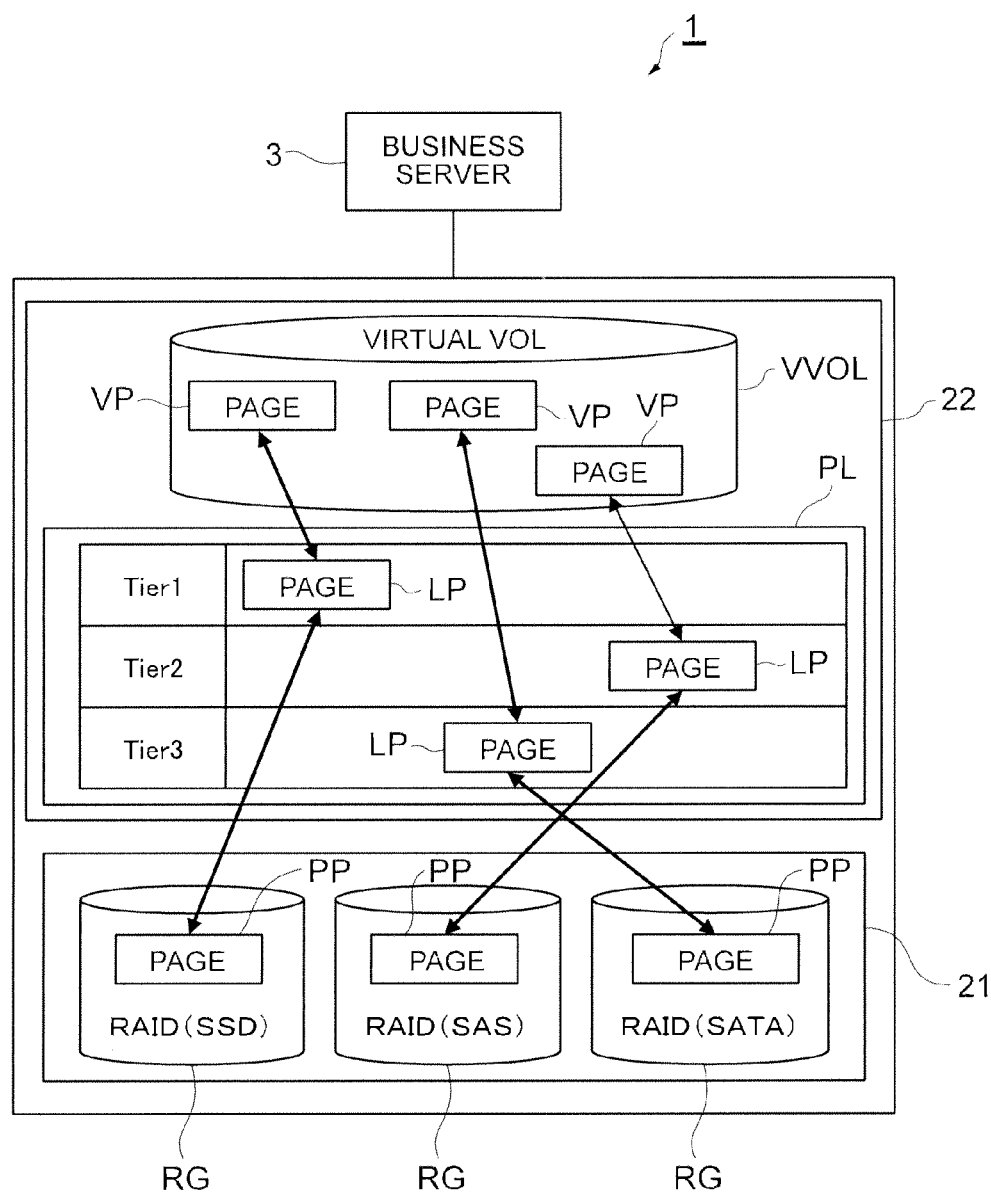
FIG. 3 is a conceptual diagram explaining the correspondence relation of the virtual pages, the logical pages and the physical pages.

In addition, when a write request is given from the business server 3 for writing data in a virtual page VP in a virtual volume VVOL to which a logical page has not yet been assigned as shown in FIG. 3, the controller 22 assigns a logical page LP to the virtual volume VVOL from a logical volume VOL belonging to any one of the storage hierarchies (first to third storage hierarchies) in the pool PL associated with that virtual volume VVOL, and stores the write-target data in the physical page PP associated with that logical page LP.

Note that, in the case of this embodiment, upon assigning the logical page LP to the virtual volume VVOL, the controller 22 assigns the logical page LP from the logical volume VOL belonging to the highest storage hierarchy among the storage hierarchies to which the logical page LP can be assigned. In the foregoing case, the hierarchical relation of the storage hierarchies is determined based on the performance of the storage device 30 to provide the storage area configuring the storage hierarchy, and the storage hierarchy to which the belongs the logical volume VOL provided by a storage device 30 with a higher performance becomes a storage hierarchy of a higher level. Accordingly, the second storage hierarchy is managed as a storage hierarchy that is of a higher level than the third storage hierarchy, and the first storage hierarchy is managed as a storage hierarchy that is of a higher level than the second storage hierarchy.

Moreover, the controller 22 constantly measures the number of accesses per second from the business server 3 to a virtual page VP (this is hereinafter referred to as the "IOPS (Input Output per second)") regarding all virtual pages VP in all virtual volumes VVOL created in the storage apparatus 4. In addition, the controller 22 executes proper hierarchy determination processing of determining the respective storage hierarchies that are proper as the placement destination of the data written in that virtual page VP based on the IOPS from the business server 3 to the virtual page VP regarding the respective virtual pages VP to which data was written from the business server 3.

In addition, the controller 22 thereafter executes relocation processing of relocating, with respect to the virtual page VP among each of the virtual pages VP of the virtual volume VVOL in which the storage hierarchy to which belongs the logical page LP (more accurately the physical page PP) storing the data written in that virtual page VP differs from the storage hierarchy that was determined as being proper as the placement destination of that data in the proper hierarchy determination processing, the data written in that virtual page VP to the physical page PP corresponding to the logical page LP to which belongs the storage hierarchy that was determined as being proper in the proper hierarchy determination processing.

(2) Storage Hierarchy Control Function of this Embodiment

The storage hierarchy control function of this embodiment provided to the storage apparatus 4 of this embodiment is now explained.

Figure 4:
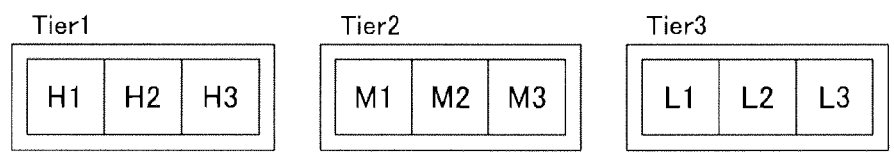
FIG. 4 is a conceptual diagram explaining the fixed storage areas, the long-term storage areas and the temporary storage areas of the first to third storage hierarchies according to this embodiment.

In the case of this embodiment, the controller 22 of the storage apparatus 4 logically or physically divides the storage area of the respective storage hierarchies (first to third storage hierarchies) in the pool into three areas as shown in FIG. 4, manages one of those areas as a fixed storage area (H1, M1 and L1 of FIG. 4), manages one of the two remaining areas as a long-term storage area (H2, M2 and L2 of FIG. 4), and the other area as a temporary storage area (H3, M3 and L3 of FIG. 4). Note that, in FIG. 4, the alphabets of "H", "M" and "L" respectively represent the respective storage hierarchies (first, second or third storage hierarchy), and the numbers of "1", "2" and "3" on the right side of the alphabet respectively represent the attributes of the corresponding areas in each of the corresponding storage hierarchies (respectively the fixed storage area, the long-term storage area or the temporary storage area). The same applies in the ensuing explanation.

Figure 5:
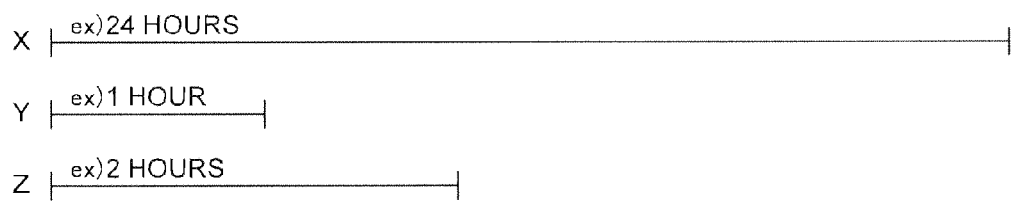
FIG. 5 is a conceptual diagram explaining the first to third time cycles.

Moreover, in the case of this embodiment, the controller 22 measures the average value of IOPS of each of a plurality of measurement cycles (this is hereinafter referred to as the "access frequency") for each virtual page VP of the respective virtual volumes VVOL. Note that, in the ensuing explanation, as shown in FIG. 5, the plurality of measurement cycles are respectively indicated as an X time cycle, a Y time cycle and a Z time cycle, and, among the X time, the Y time and the Z time, the X time is the longest (for example, 24 hours), the Z time is the next longest (for example, 2 hours), and the Y time is the shortest (for example, 1 hour).

Figure 6:
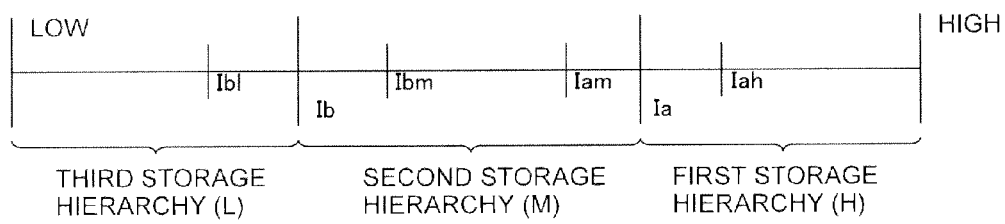
FIG. 6 is a conceptual diagram explaining the respective thresholds.

In addition, as shown in FIG. 6, the controller 22 stores and retains, in the memory 32 (FIG. 1), a first threshold (this is hereinafter referred to as the "first access frequency threshold") Ia and a second threshold (this is hereinafter referred to as the "second access frequency threshold) Ib to become the reference values upon determining in which logical page LP belonging to which storage hierarchy, among the first to third storage hierarchies, the data written in each of the pre-set virtual pages VP should be stored.

In the foregoing case, the first access frequency threshold Ia is the reference value upon determining in which logical page LP of either the first or second storage hierarchy the data written in the virtual page VP should be stored, and the second access frequency threshold Ib is the reference value upon determining in which logical page LP of either the second or third storage hierarchy the data written in the virtual page VP should be stored.

Moreover, before and after the first access frequency threshold Ia, set are a first low-side access frequency threshold Iam in which the access frequency is lower than the first access frequency threshold Ia by a predetermined amount and a first high-side access frequency threshold Iah in which the access frequency is higher than the first access frequency threshold Ia by a predetermined amount. In addition, before and after the second access frequency threshold Ib, set are a second low-side access frequency threshold Ibl in which the access frequency is lower than the second access frequency threshold Ib by a predetermined amount, and a second high-side access frequency threshold Ibm in which the access frequency is higher than the second access frequency threshold Ib by a predetermined amount.

In addition, as the foregoing proper hierarchy determination processing, the controller 22 determines, for example, in the Y time cycle, the storage hierarchy that is proper as the placement destination of the data written in the respective virtual pages VP in the virtual volume VVOL.

For all practical purposes, with respect to a virtual page VP to which is assigned a logical page LP belonging to the long-term storage area (H2, M2 or L2) of the first to third storage hierarchies among the respective virtual pages VP in the virtual volume VVOL to which data was written, the controller 22 compares the access frequency (Ix) of the immediate X time with the first and second access frequency thresholds Ia, Ib, and compares the access frequency (Iy) of the immediate Y time with the first high-side access frequency threshold Iah, the first low-side access frequency threshold Iam, the second high-side access frequency threshold Ibm and/or the second low-side access frequency threshold Ibl.

In the foregoing case, for instance, as shown in FIG. 7, when the access frequency (Ix) in the immediate X time is not less than the first access frequency threshold Ia and the access frequency (Iy) in the immediate Y time is not less than the first low-side access frequency threshold Iam, it is considered that the access frequency to the corresponding virtual page VP is high from both a long-term perspective and a short-term perspective. Consequently, here, the controller 22 determines the long-term storage area (H2) of the first storage hierarchy as the appropriate placement destination of the data written in the corresponding virtual page VP.

Moreover, when the access frequency (Ix) in the immediate X time is no less than the first access frequency threshold Ia and the access frequency (Iy) in the immediate Y time is less than the first low-side access frequency threshold Iam, while the current access frequency to the corresponding virtual page VP is not that high from a short-term perspective, since it is high from a long-term perspective, it is assumed that the access frequency to that virtual page VP will increase in the future. Consequently, here, the controller 22 determines the temporary storage area (H3) of the second storage hierarchy as the appropriate placement destination of the data written in the corresponding virtual page VP.

Meanwhile, when the access frequency (Ix) in the immediate X time is less than the first access frequency threshold Ia and not less than the second access frequency threshold Ib, and the access frequency (Iy) in the immediate Y time is not less than the first high-side access frequency threshold Iah, while the access frequency to the corresponding virtual page VP is not that high from a long-term perspective, since it is high from a short-term perspective, it is assumed that the immediate access frequency is temporarily high. Consequently, here, the controller 22 determines the temporary storage area (H3) of the first storage hierarchy as the appropriate placement destination of the data written in the corresponding virtual page VP.

Moreover, when the access frequency (Ix) in the immediate X time is less than the first access frequency threshold Ia and not less than the second access frequency threshold Ib, and the access frequency (Iy) in the immediate Y time is less than the first high-side access frequency threshold Iah and not less than the second low-side access frequency threshold Ibl, since the current access frequency is not that high from both a long-term perspective and a short-term perspective, it is assumed that the access frequency will not drastically increase in the future. Consequently, here, the controller 22 determines the long-term storage area (M2) of the second storage hierarchy as the appropriate placement destination of the data written in the corresponding virtual page VP.

In addition, when the access frequency (Ix) in the immediate X time is less than the first access frequency threshold Ia and not less than the second access frequency threshold Ib, and the access frequency (Iy) in the immediate Y time is less than the second high-side access frequency threshold Iah, while the access frequency is low from a short-term perspective, since the access frequency is not that low from a long-term perspective, it is assumed that the access frequency may return to a level of being not too high and not too low in the future. Consequently, here, the controller 22 determines the temporary storage area (L3) of the third storage hierarchy as the appropriate placement destination of the data written in the corresponding virtual page VP.

Meanwhile, when the access frequency (Ix) in the immediate X time is less than the second access frequency threshold Ib and the access frequency (Iy) in the immediate Y time is not less than the second high-side access frequency threshold Ibm, while the access frequency is in a state of being not too high and not too low from a short-term perspective, since the access frequency is low from a long-term perspective, it is assumed that the access frequency may decrease in the future. Consequently, here, the controller 22 determines the temporary storage area (M3) of the second storage hierarchy as the appropriate placement destination of the data written in the corresponding virtual page VP.

Moreover, when the access frequency (Ix) in the immediate X time is less than the second access frequency threshold Ib, and the access frequency (Iy) in the immediate Y time is less than the second high-side access frequency threshold Ibm, since the access frequency is low from both a long-term perspective and a short-term perspective, it is assumed that the access frequency will change at a low level in the future. Consequently, here, the controller 22 determines the long-term storage area (L3) of the third storage hierarchy as the appropriate placement destination of the data written in the corresponding virtual page VP.

Meanwhile, with respect to a virtual page VP to which is assigned a logical page LP belonging to the temporary storage area (H3, M3 or L3) of the first to third storage hierarchies among the respective virtual pages VP in the virtual volume VVOL to which data was written, the controller 22 determines whether that data should be placed in the long-term storage area (H2, M2 or L2) of the same storage hierarchy, or in the long-term storage area (H2, M2 or L2) of another storage hierarchy.

Specifically, with respect to a virtual page VP to which is assigned a logical page LP belonging to the temporary storage area (H3, M3 or L3) of the first to third storage hierarchies, the controller 22 compares the access frequency (Iz) in the immediate Z time with the first high-side access frequency threshold Iah, the first low-side access frequency threshold Iam, the second high-side access frequency threshold Ibm or the second low-side access frequency threshold Ibl.

In the foregoing case, for instance, as shown in FIG. 8, when the data written in the target virtual page VP is stored in the temporary storage area (H3) of the first storage hierarchy, and the access frequency (Iz) in the immediate Z time is not less than the first high-side access frequency threshold Iah, the access frequency to the corresponding virtual page VP is assumed to also be high in the future even from a medium-term perspective. Consequently, here, the controller 22 determines that the data written in that virtual page VP should be placed in the long-term storage area (H2) of the first storage hierarchy.

Moreover, when the data written in the target virtual page VP is stored in the temporary storage area (H3) of the first storage hierarchy, and the access frequency (Iz) in the immediate Z time is less than the first high-side access frequency threshold Iah, while the access frequency to the corresponding virtual page VP is temporarily high for a short period of time, it is assumed to become lower in the future from a medium-term perspective. Consequently, here, the controller 22 determines that the data written in that virtual page VP should be placed in the long-term storage area (M2) of the second storage hierarchy.

Meanwhile, when the data written in the target virtual page VP is stored in the temporary storage area (M3) of the second storage hierarchy, and the access frequency (Iz) in the immediate Z time is not less than the first low-side access frequency threshold Iam, the access frequency to the corresponding virtual page VP is assumed to become higher in the future from both a short-term perspective and a medium-term perspective. Consequently, here, the controller 22 determines that the data written in that virtual page VP should be placed in the long-term storage area (H2) of the first storage hierarchy.

Moreover, when the data written in the target virtual page VP is stored in the temporary storage area (M2) of the second storage hierarchy, and the access frequency (Iz) in the immediate Z time is less than the first low-side access frequency threshold Iam and not less than the second high-side access frequency threshold Ibm, the access frequency to the corresponding virtual page VP is assumed to maintain a state of a level that is not high or low in the future even from a medium-term perspective. Consequently, here, the controller 22 determines that the data written in that virtual page VP should be placed in the long-term storage area (M2) of the second storage hierarchy.

In addition, when the data written in the target virtual page VP is stored in the temporary storage area (M3) of the second storage hierarchy, and the access frequency (Iz) in the immediate Z time is less than the first low-side access frequency threshold Iam, the access frequency to the corresponding virtual page VP is assumed to become lower in the future even from a medium-term perspective. Consequently, here, the controller 22 determines that the data written in that virtual page VP should be placed in the long-term storage area (L2) of the third storage hierarchy. Meanwhile, when the data written in the target virtual page VP is stored in the temporary storage area (L3) of the third storage hierarchy, and the access frequency (Iz) in the immediate Z time is not less than the second low-side access frequency threshold Ibl, the access frequency to the corresponding virtual page VP is assumed to become higher in the future from a medium-term perspective. Consequently, here, the controller 22 determines that the data written in that virtual page VP should be placed in the long-term storage area (M2) of the second storage hierarchy.

Moreover, when the data written in the target virtual page VP is stored in the temporary storage area (L3) of the third storage hierarchy, and the access frequency (Iz) in the immediate Z time is less than the second low-side access frequency threshold Ibl, the access frequency to the corresponding virtual page VP is assumed to become lower in the future from a medium-term perspective. Consequently, here, the controller 22 determines that the data written in that virtual page VP should be placed in the long-term storage area (L2) of the third storage hierarchy.

Subsequently, when the controller 22 determines, in the manner described above, the proper placement destination of data written in the respective virtual pages VP regarding the virtual pages VP in which data is stored in the long-term storage area (H2, M2, L2) and the temporary storage area (H3, M3, L3) of the respective storage hierarchies among all virtual pages VP in the respective virtual volumes VVOL with data written therein, the controller 22 relocates, as needed, the data written in the respective virtual pages VP to a logical page LP belonging to the corresponding area (long-term storage area or temporary storage area) in each of the corresponding storage hierarchies (first to third storage hierarchies) in accordance with the foregoing determination result (relocation processing).

Note that, in this embodiment, the user can designate, in data units, certain data to be fixed and placed in the intended storage hierarchy, and such designated data is stored in the fixed storage area (H1, M1, L1) of the designated storage hierarchy. In addition, a virtual page VP with such data written therein is not subject to the proper hierarchy determination processing and the relocation processing. Accordingly, the foregoing data is not relocated and constantly maintained in a state of being placed in the designated storage hierarchy.

As means for realizing the foregoing hierarchy control function according to this embodiment, the memory 32 (FIG. 1) of the storage apparatus 4 stores a page management table 40 shown in FIG. 9, and a hierarchy management table 41 shown in FIG. 10.

Among the above, the page management table 40 is a table that is used for managing the logical pages LP in the respective pools PL created in the storage apparatus 4, and is configured, as shown in FIG. 9, from a pool number column 40A, a capacity column 40B, a page number column 40C, a virtual volume number column 40D, an assignment column 40E, a storage hierarchy/area attribute column 40F, a first access frequency column 40G, a second access frequency column 40H, a third access frequency column 40I, a hierarchy fixation column 40J, and a corresponding physical page column 40K.

The pool number column 40A stores the identifier assigned to each of the pools PL created in the storage apparatus 4, and the capacity column 40B stores the capacity of the corresponding pool PL. The page number column 40C stores the identifier (page number) assigned to each of the logical pages LP in the corresponding pool PL. Note that the page number assigned to each of the logical pages LP in the respective pools PL is unique to that logical page LP in the storage apparatus 4, and assigned so that it will not overlap with any page number of any logical page LP in any of the pools PL.

The assignment column 40E stores information indicating whether the corresponding logical page LP has been assigned to any one of the virtual pages VP in any one of the virtual volumes VVOL ("Assigned" is indicated when assigned and "Not assigned" is indicated when not yet assigned), and the virtual volume number column 40D stores, when the corresponding logical page VP has been assigned to any one of the virtual pages VP, the volume number (LUN: Logical Unit Number) of the virtual volume VVOL having that virtual page VP. Note that when the corresponding logical page LP is not assigned to any one of the virtual pages VP, the virtual volume number column 40D stores information ("Not assigned") indicating such non-assignment. The storage hierarchy/area attribute column 40F stores the storage hierarchy to which the corresponding logical page LP belongs and the identifier (H1 to H3, M1 to M3, L1 to L3) indicating that storage hierarchy.

The first access frequency column 40G stores the access frequency (Ix), in the immediate X time, to the virtual page VP to which the corresponding logical page LP was assigned, and the second access frequency column 40H stores the access frequency (Iy), in the immediate Y time, to that virtual page VP. Similarly, the third access frequency column 40I stores the access frequency (Iz), in the immediate Z time, to that virtual page VP. Note that the access frequencies (Ix to Iz) stored in the first to third access frequency columns 40G to 40I are updated in the Y time cycle based on the IOPS to the individual virtual pages VP measured based on the measurement function of the storage apparatus 4.

The hierarchy fixation column 40J stores, when the storage hierarchy of the placement destination of data is designated for that data written in a virtual page VP to which the corresponding logical page LP was assigned, the identifier (H1, M1 or L1) representing the fixed storage area in that storage hierarchy, and stores, when there is no such designation, information ("None") indicating such non-designation. The corresponding physical page column 40K stores the page number of the physical page PP associated with the corresponding logical page LP.

Meanwhile, the hierarchy management table 41 is a table that is used for managing the configuration of the first to third storage hierarchies in one pool, and created for each pool PL. The hierarchy management table 41 is configured, as shown in FIG. 10, from a storage hierarchy/area attribute column 41A, a RAID group column 41B, a RAID level column 41C, a storage device type column 41D and an emulation type column 41E.

The storage hierarchy/area attribute column 41A stores the identifier (H1 to H3, M1 to M3 and L1 to L3) representing each of the storage areas (fixed storage area, long-term storage area or temporary storage area) in the first to third storage hierarchies in the corresponding pool PL, and the RAID group column 41B stores the identifier of the RAID group RG (FIG. 2) to provide the area of the corresponding area attribute in the corresponding storage hierarchy.

The RAID level column 41C is configured from a level column 41CA and a configuration column 41CB. The level column 41CA stores the RAID level of the corresponding RAID group RG, and the configuration column 41CB stores the RAID configuration of the corresponding RAID group RG. Note that, as the RAID level, there are, for instance, "RAID 1" to "RAID 6" and "RAID 1+0". Moreover, in the configuration column 41CB, the numerical value on the left side of "D" represents the number of storage devices 30 storing the data, and the numerical value on the left side of "P" represents the number of storage devices 30 storing parity. Accordingly, for instance, "3D+1P" represents that the corresponding RAID group RG is configured from four storage devices 30, and among those three storage devices 30 are used for storing data and one storage device 30 is used for storing parity.

The storage device type column 41D is configured from a type column 41DA and a capacity column 41DB. The type column 41DA stores the type of the storage device 30 ("SSD", "SAS" or "SATA") configuring the corresponding RAID group RG, and the capacity column 41DB stores the individual storage capacities of those storage devices 30. The emulation type column 41E stores the emulation type of the corresponding RAID group RG.

Accordingly, in the example of FIG. 10, the fixed storage area ("H1") of the first storage hierarchy of the corresponding pool PL is configured from the storage area (logical volume VOL) provided by two RAID groups RG respectively assigned the identifier of "1-1" or "1-2", and among the above the RAID group RG of "1-1" is a RAID group RG that is configured from a "200 GB" "SSD", has a RAID level of "RAID 5", and has a RAID configuration of "3D+1", and in which the emulation type is "openV".

(3) Processing of CPU Related to Hierarchy Storage Control Function

The specific processing contents of the CPU 31 (FIG. 2) in the controller 22 of the storage apparatus 4 related to the hierarchy storage control function of this embodiment is now explained.

(3-1) Pool Creation Processing

Figure 11:
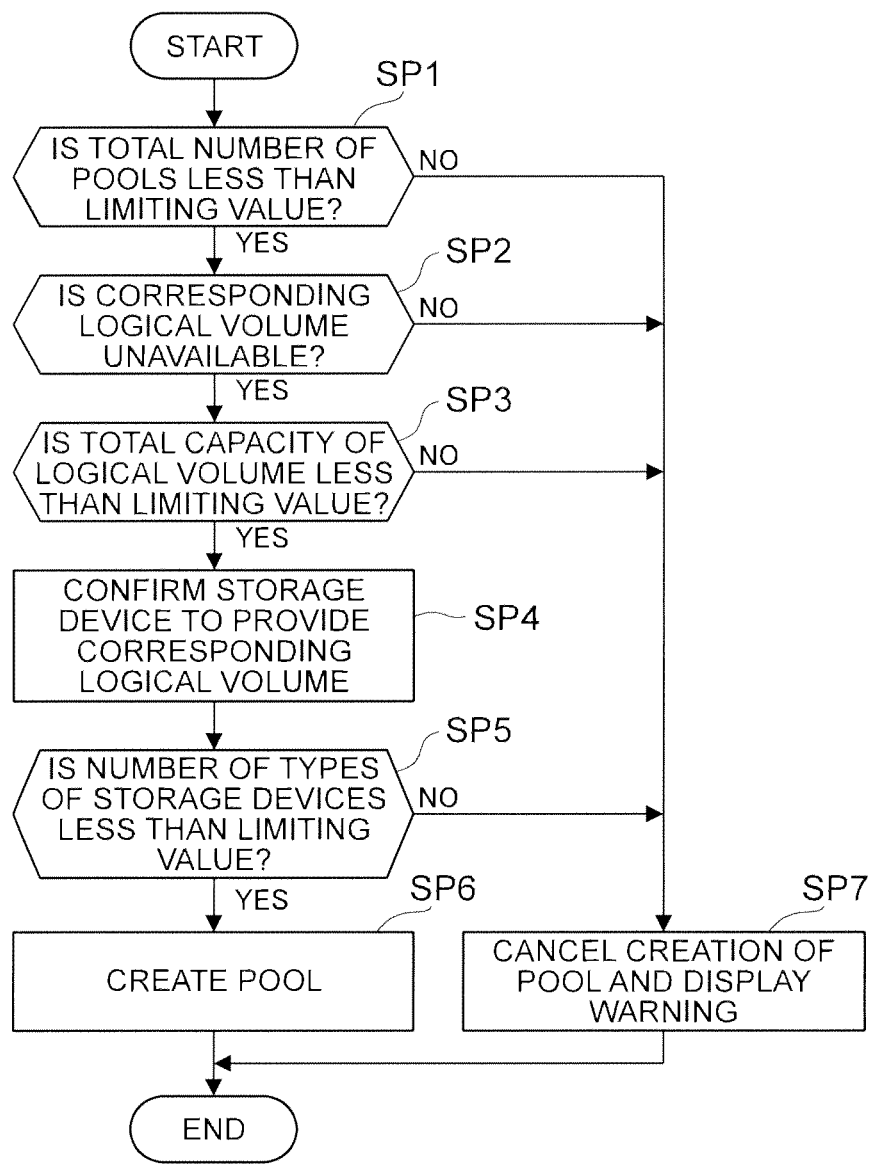
FIG. 11 is a flowchart showing the processing routine of the pool creation processing.

FIG. 11 shows the processing routine of pool creation processing that is executed by the CPU 31 of the storage apparatus 4 when a command for creating a pool (this is hereinafter referred to as the "pool creation command") is input via the management device 36 (FIG. 1).

When the management device 36 is operated and a plurality of logical volumes VOL of a plurality of types are designated, and the CPU 31 receives a pool creation command for creating a pool PL configured from the foregoing logical volumes VOL, the CPU 31 stars the pool creation processing shown in FIG. 11, and foremost determined whether the total number of pools PL existing in the storage apparatus 4 will be less than a predetermined limiting value even when the designated pool PL is created (SP1).

When the CPU 31 obtains a negative result in the foregoing determination, the CPU 31 cancels the creation of the designated pool PL, causes a display device of the management device 36 to display a warning to the effect that the designated pool PL cannot be created (SP7), and thereafter ends this pool creation processing.

Meanwhile, when the CPU 31 obtains a positive result in the determination of step SP1, the CPU 31 determines whether the logical volume VOL that was designated as the logical volume VOL to configure the pool PL to be newly created can be used as the logical volume VOL to configure the pool PL (for example, whether the corresponding logical volume VOL is being directly provided to the business server 3) (SP2). When the CPU 31 obtains a negative result in the foregoing determination, the CPU 31 proceeds to step SP7 and, after performing step SP7 in the same manner as described above, ends this pool creation processing.

Meanwhile, when the CPU 31 obtains a positive result in the determination of step SP2, the CPU 31 determines whether the total capacity of the respective logical volumes VOL in the pool PL to be created (that is, the capacity of that pool PL) is less than a predetermined limiting value (SP3). When the CPU 31 obtains a negative result in the foregoing determination, the CPU 31 proceeds to step SP7 and, after performing step SP7 in the same manner as described above, ends this pool creation processing.

When the CPU 31 obtains a positive result in the determination of step SP3, the CPU 31 confirms the respective types of the storage devices 30 to provide the respective logical volumes VOL that were designated as the logical volumes VOL to configure the pool PL to be created (SP4).

Subsequently, the CPU 31 determines, based on the confirmation result of step SP4, whether the number of types of the storage devices 30 to provide the respective logical volumes VOL that were designated as the logical volumes VOL to configure the pool PL to be created is less than a predetermined limiting value (SP5).

For example, with the storage apparatus 4 according to this embodiment, the respective pools PL do not necessarily have to be configured from the first to third storage hierarchies, and the storage hierarchies may also be configured from only the first and second storage hierarchies. Thus, when the number of types of the storage devices 30 to provide the respective logical volumes VOL that were designated as the logical volumes VOL to configure the pool PL to be created is three types, a negative result will be obtained in step SP5. Consequently, when the CPU 31 obtains a negative result in the foregoing determination, the CPU 31 proceeds to step SP7 and, after performing step SP7 in the same manner as described above, ends this pool creation processing.

Meanwhile, when the CPU 31 obtains a positive result in the determination of step SP5, the CPU 31 creates the designated pool PL. Specifically, the CPU 31 retains, in the memory 32 (FIG. 1), a table not shown for managing the logical volumes VOL configuring the respective pools PL in the storage apparatus 4 (this is hereinafter referred to as the "pool management table"), and registers, in this pool management table, the pool PL to be newly created, and the logical volumes VOL to configure that pool PL (SP6).

When the CPU 31 creates the pool PL as described above, the CPU 31 ends this pool creation processing.

(3-2) Virtual Volume Creation Processing

Figure 12:
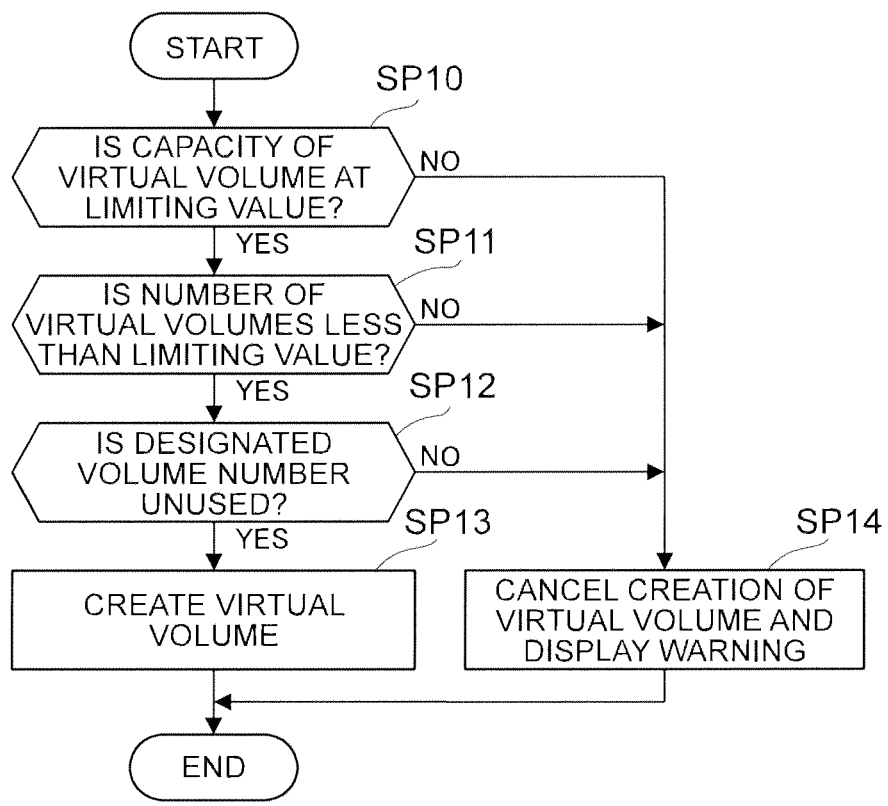
FIG. 12 is a flowchart showing the processing routine of the virtual volume creation processing.

Meanwhile, FIG. 12 shows the processing routine of the virtual volume creation processing that is executed by the CPU 31 of the storage apparatus 4 when a command for creating a virtual volume VVOL (this is hereinafter referred to as the "virtual volume creation command") is input via the management device 36 (FIG. 1).

When the management device 36 is operated and information such as the number of virtual volumes VVOL to be created, the capacity of the respective virtual volumes VVOL, the volume number of the respective virtual volumes VVOL, and the identification number of the pool PL to be associated with the created virtual volumes VVOL (hereinafter collectively referred to as the "virtual volume creation information") is input, and a command for creating that virtual volume VVOL (virtual volume creation command) is input, the CPU 31 commences the virtual volume creation processing, and foremost determines, based on the input virtual volume creation information, whether the capacity of each virtual volume VVOL to be created is less than a predetermined limiting value (SP10).

When the CPU 31 obtains a negative result in the foregoing determination, the CPU 31 cancels the creation of the virtual volume VVOL, causes the display device of the management device 36 to display the cause of cancellation (SP14), and thereafter ends this virtual volume creation processing.

Meanwhile, when the CPU 31 obtains a positive result in the determination of step SP10, the CPU 31 determines whether the total value of the number of virtual volumes VVOL to be created and the number of virtual volumes VVOL that currently exist in the storage apparatus 4 will be less than a predetermined limiting value (SP11).

When the CPU 31 obtains a negative result in the foregoing determination, the CPU 31 proceeds to step SP14 and, after performing step SP14 in the same manner as described above, ends this virtual volume creation processing.

Meanwhile, when the CPU 31 obtains a positive result in the determination of step SP11, the CPU 31 determines, based on the virtual volume creation information, whether the input volume number to be assigned to the virtual volume VVOL to be created is unused (SP12).

When the CPU 31 obtains a negative result in the foregoing determination, the CPU 31 proceeds to step SP14 and, after performing step SP14 in the same manner as described above, ends this virtual volume creation processing.

Meanwhile, when the CPU 31 obtains a positive result in the determination of step SP12, the CPU 31 creates all designated virtual volumes VVOL based on the virtual volume creation information (SP13). Specifically, the CPU 31 retains, in the memory 32 (FIG. 1), a management table not shown for managing the virtual volumes VVOL (this is hereinafter referred to as the "virtual volume management table"), and creates the virtual volumes VVOL by registering necessary information in this virtual volume management table. The CPU 31 thereafter ends this virtual volume creation processing.

(3-3) Proper Hierarchy Determination Processing

FIG. 13 shows the specific processing contents of the proper hierarchy determination processing to be executed by the CPU 31 in the Y time cycle in relation to the hierarchy storage control function according to this embodiment described above. The CPU 31 determines the proper storage hierarchies as the placement destination of the data written in the respective virtual pages VP of the virtual volume VVOL according to the processing routine shown in FIG. 13.

In other words, when the CPU 31 starts this proper hierarchy determination processing, the CPU 31 foremost refers to the page management table 40 (FIG. 9), selects one virtual page VP to which the processing of step SP31 onward has not yet been performed (SP30), and determines, based on the page management table 40, whether a storage hierarchy of the placement destination has been designated for the data written in the selected virtual page (this is hereinafter referred to as the "selected virtual page") VP (SP31).

When the CPU 31 obtains a positive result in the foregoing determination, the CPU 31 controls the corresponding storage device 30, as needed, to relocate the data written in the selected virtual page VP to the fixed storage area (H1, M1 or L1) in the designated first, second or third storage hierarchy (S32), and thereafter proceeds to step SP47.

Meanwhile, when the CPU 31 obtains a negative result in the determination of step SP31, the CPU 31 refers to the page management table 40, and determines whether the storage hierarchy and area attribute to which the logical page LP currently assigned to the selected virtual page VP is one among "H2", "M2" and "L2" (SP33).

When the CPU 31 obtains a negative result in the foregoing determination, the CPU 31 refers to a management table not shown indicating which logical page LP is assigned to the respective virtual pages VP of the respective virtual volumes VVOL (this is hereinafter referred to as the "logical page assignment destination management table") and the page management table 40, and determines whether the access frequency (Ix), in the immediate X time, to the selected virtual page VP is not less than the first access frequency threshold Ia (SP34). Moreover, when the CPU 31 obtains a positive result in the foregoing determination, the CPU 31 refers to the foregoing logical page assignment destination management table and page management table 40, and determines whether the access frequency (Iy), in the immediately Y time, to the selected virtual page VP is not less than the first low-side access frequency threshold Iam (SP35).

When the CPU 31 obtains a positive result in the foregoing determination, the CPU 31 determines the storage hierarchy and area attribute which are proper as the placement destination of the data written in the selected virtual page VP as "H2" (SP36), and thereafter proceeds to step SP60. Moreover, when the CPU 31 obtains a negative result in the determination of step SP35, the CPU 31 determines the storage hierarchy and area attribute which are proper as the placement destination of the data written in the selected virtual page VP as "M3" (SP37), and thereafter proceeds to step SP60.

Meanwhile, when the CPU 31 obtains a negative result in the determination of step SP34, the CPU 31 refers to the foregoing logical page assignment destination management table and page management table 40, and determines whether the access frequency (Ix), in the immediate X time, to the selected virtual page VP is not less than the second access frequency threshold Ib (SP38).

When the CPU 31 obtains a positive result in the foregoing determination, the CPU 31 refers to the foregoing logical page assignment destination management table and page management table 40, and determines whether the access frequency (Iy), in the immediate Y time, to the selected virtual page VP is not less than the first high-side access frequency threshold Iah (SP39). When the CPU 31 obtains a positive result in the foregoing determination, the CPU 31 determines the storage hierarchy and area attribute which are proper as the placement destination of the data written in the selected virtual page VP as "H3" (SP40), and thereafter proceeds to step SP60.

Moreover, when the CPU 31 obtains a negative result in the determination of step SP41, the CPU 31 refers to the foregoing logical page assignment destination management table and page management table 40, and determines whether the access frequency (Iy), in the immediately Y time, to the selected virtual page VP is not less than the second low-side access frequency threshold Ibl (SP41). When the CPU 31 obtains a positive result in the foregoing determination, the CPU 31 determines the storage hierarchy and area attribute which are proper as the placement destination of the data written in the selected virtual page VP as "M2" (SP42), and thereafter proceeds to step SP60. Moreover, when the CPU 31 obtains a negative result in the determination of step SP41, the CPU 31 determines the storage hierarchy and area attribute which are proper as the placement destination of the data written in the selected virtual page VP as "L3" (SP43), and thereafter proceeds to step SP60.

Meanwhile, when the CPU 31 obtains a negative result in the determination of step SP38, the CPU 31 refers to the foregoing logical page assignment destination management table and page management table 40, and determines whether the access frequency (Iy), in the immediately Y time, to the selected virtual page VP is not less than the second high-side access frequency threshold Ibm (SP44). When the CPU 31 obtains a positive result in the foregoing determination, the CPU 31 determines the storage hierarchy and area attribute which are proper as the placement destination of the data written in the selected virtual page VP as "M3" (SP45), and thereafter proceeds to step SP60. Moreover, when the CPU 31 obtains a negative result in the determination of step SP44, the CPU 31 determines the storage hierarchy and area attribute which are proper as the placement destination of the data written in the selected virtual page VP as "L2" (SP46), and thereafter proceeds to step SP60.

Meanwhile, when the CPU 31 obtains a negative result in the determination of step SP33, the CPU 31 refers to the foregoing logical page assignment destination management table and page management table 40, and determines whether the storage hierarchy and area attribute to which the logical page LP currently assigned to the selected virtual page VP belongs is "H3" (SP47).

When the CPU 31 obtains a positive result in the foregoing determination, the CPU 31 refers to the foregoing logical page assignment destination management table and page management table 40, and determines whether the access frequency (Iz), in the immediate Z time, to the selected virtual page VP is not less than the first high-side access frequency threshold Iah (SP48). When the CPU 31 obtains a positive result in the foregoing determination, the CPU 31 determines the storage hierarchy and area attribute which are proper as the placement destination of the data written in the selected virtual page VP as "H2" (SP49), and thereafter proceeds to step SP60. Moreover, when the CPU 31 obtains a negative result in the determination of step SP48, the CPU 31 determines the storage hierarchy and area attribute which are proper as the placement destination of the data written in the selected virtual page VP as "M2" (SP50), and thereafter proceeds to step SP60.

Meanwhile, when the CPU 31 obtains a negative result in the determination of step SP47, the CPU 31 refers to the foregoing logical page assignment destination management table and page management table 40, and determines whether the storage hierarchy and area attribute to which the logical page LP currently assigned to the selected virtual page VP belongs is "M3" (SP51).

When the CPU 31 obtains a positive result in the foregoing determination, the CPU 31 refers to the foregoing logical page assignment destination management table and page management table 40, and determines whether the access frequency (Iz), in the immediately Z time, to the selected virtual page VP is not less than the first low-side access frequency threshold Iam (SP52). When the CPU 31 obtains a positive result in the foregoing determination, the CPU 31 determines the storage hierarchy and area attribute which are proper as the placement destination of the data written in the selected virtual page VP as "H2" (SP53), and thereafter proceeds to step SP60.

Meanwhile, when the CPU 31 obtains a negative result in the determination of step SP52, the CPU 31 refers to the foregoing logical page assignment destination management table and page management table 40, and determines whether the access frequency (Iz), in the immediate Z time, to the selected virtual page VP is not less than the second high-side access frequency threshold Ibm (SP54). When the CPU 31 obtains a positive result in the foregoing determination, the CPU 31 determines the storage hierarchy and area attribute which are proper as the placement destination of the data written in the selected virtual page VP as "M2" (SP55), and thereafter proceeds to step SP60. Moreover, when the CPU 31 obtains a negative result in the determination of step SP54, the CPU 31 determines the storage hierarchy and area attribute which are proper as the placement destination of the data written in the selected virtual page VP as "L2" (SP56), and thereafter proceeds to step SP60.

Meanwhile, when the CPU 31 obtains a negative result in the determination of step SP51, the CPU 31 refers to the foregoing logical page assignment destination management table and page management table 40, and determines whether the access frequency (Iz), in the immediate Z time, to the selected virtual page VP is not less than the second low-side access frequency threshold Ibl (SP57). When the CPU 31 obtains a positive result in the foregoing determination, the CPU 31 determines the storage hierarchy and area attribute which are proper as the placement destination of the data written in the selected virtual page VP as "M2" (SP58), and thereafter proceeds to step SP60. Moreover, when the CPU 31 obtains a negative result in the determination of step SP57, the CPU 31 determines the storage hierarchy and area attribute which are proper as the placement destination of the data written in the selected virtual page VP as "L2" (SP59), and thereafter proceeds to step SP60.

Subsequently, when the CPU 31 proceeds to step SP60, whether the processing of step SP31 onward has been completed for all virtual pages VP in the respective virtual volumes VVOL in the storage apparatus 4 to which data was written therein is determined (SP60).

When the CPU 31 obtains a negative result in the foregoing determination, the CPU 31 returns to step SP30, and thereafter repeats the processing of step SP30 to step SP60 while sequentially switching the virtual page VP selected in the step SP30 to another virtual page VP.

When the CPU 31 obtains a positive result in step SP 60 as a result of the processing of step SP31 onward has been completed for all virtual pages in the respective virtual volumes VVOL in the storage apparatus 4 to which data was written therein, the CPU 31 ends this proper hierarchy determination processing.

(3-4) Relocation Processing

Figure 14:
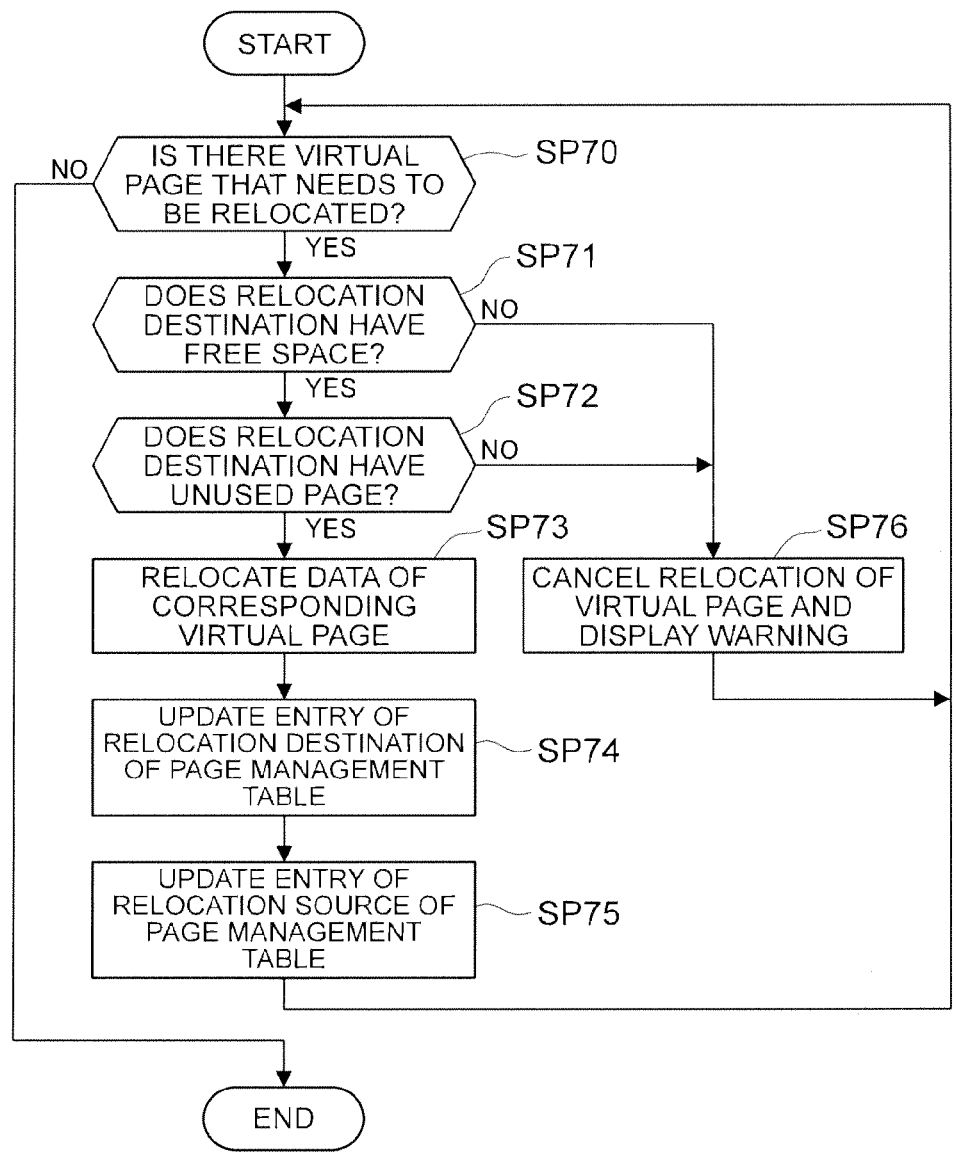
FIG. 14 is a flowchart showing the processing routine of the relocation processing.

FIG. 14 shows the processing routine of the relocation processing to be executed by the CPU 31 subsequent to the foregoing proper hierarchy determination processing. The CPU 31 relocates, with respect to the virtual page VP in which the storage hierarchy and area attribute to which belongs the currently assigned logical page LP differs from the storage hierarchy and area attribute that were determined as being proper in the proper hierarchy determination processing, the data written in that virtual page VP to the physical page PP corresponding to the logical page LP to which the proper storage hierarchy and area attribute belong according to the processing routine shown in FIG. 14.

For all practical purposes, the CPU 31 determines whether there is a virtual page VP in which data relocation is required when the foregoing proper hierarchy determination processing explained with reference to FIG. 13A and FIG. 13B is ended (SP70). This determination is made by determining, with respect to the virtual page VP in the respective virtual volumes VVOL to which data is written therein, whether it is a virtual page VP in which the storage hierarchy and area attribute to which the currently assigned logical page LP belongs differ from the storage hierarchy and area attribute that were determined as being proper in the foregoing proper hierarchy determination processing, and whether there is a virtual page VP to which the processing of step SP71 onward has not yet been performed.

When the CPU 31 obtains a positive result in the foregoing determination, the CPU 31 selects one virtual VP in which data relocation is required, and determines whether the there is free space in the storage hierarchy that was determined as being proper in the foregoing proper hierarchy determination processing regarding the selected virtual page VP (this is hereinafter referred to as the "corresponding virtual page VP") (SP71). When the CPU 31 obtains a negative result in the foregoing determination, the CPU 31 cancels the relocation processing of the corresponding virtual page VP, and causes the management device 36 (FIG. 1) to display a warning to the effect that there is no free space in the storage area for storing the data written in the corresponding virtual page VP (SP76). The CPU 31 thereafter returns to step SP70.

Meanwhile, when the CPU 31 obtains a positive result in the determination of step SP71, the CPU 31 determines whether there is an unused logical page LP belonging to an appropriate area attribute in the storage hierarchy that was determined as being proper in the foregoing proper hierarchy determination processing regarding the corresponding virtual page VP (SP72). When the CPU 31 obtains a negative result in the foregoing determination, the CPU 31 proceeds to step SP76 and, after performing step SP76 in the same manner as described above, returns to step SP70.

Meanwhile, when the CPU 31 obtains a positive result in the determination of step SP72, the CPU 31 newly assigns the unused logical page LP selected in step SP70 to the corresponding virtual page VP, and controls the corresponding storage device 30 to migrate the data written in the corresponding virtual page VP to the physical page PP associated with that logical page LP (SP73).

Subsequently, the CPU 31 updates the foregoing logical page assignment destination management table in accordance with the processing of step SP73, and updates, in the page management table 40 (FIG. 9), the contents of the entry (line) corresponding to the logical page LP of the relocation destination that was newly assigned to the corresponding virtual page VP in step SP73 to the contents after relocation (SP74).

In addition, the CPU 31 updates the contents of the entry (line) corresponding to the logical page LP of the relocation source in the page management table 40 (FIG. 9) to the contents after relocation (SP75), and thereafter returns to step SP70. The CPU 31 thereafter repeats the processing of step SP70 to step SP76 while sequentially switching the corresponding virtual page VP selected in step SP70 to another virtual page VP.

Subsequently, when the CPU 31 obtains a negative result in step SP70 as a result of the processing of step SP70 to step SP76 being eventually completed for all virtual pages VP in which the storage hierarchy and area attribute to which the currently assigned logical page LP belongs differ from the storage hierarchy and area attribute which were determined as being proper in the proper hierarchy determination processing, the CPU 31 ends this relocation processing.

(4) Effect of this Embodiment

As described above, with the computer system 1 according to this embodiment, since the storage apparatus 4 determines the proper storage hierarchy as the placement destination of the data written in the respective virtual pages VP of the virtual volume VVOL based on the access frequency (Ix, Iy, Iz) of a plurality of measurement cycles, the data written in the virtual page VP of the virtual volume VVOL can be placed in a logical page LP belonging to a more proper storage hierarchy from both a long-term perspective and a short-term perspective.

Consequently, it is possible to effectively prevent the occurrence of a drawback where a high performance storage area is occupied by data with a temporarily high access frequency and the reply performance of the storage apparatus 4 is consequently deteriorated, and thereby realize a storage apparatus capable of preventing the workload of system operation from increasing while preventing the deterioration of system performance.

(5) Other Embodiments

Note that, while the foregoing embodiment explained a case of applying the present invention to the storage apparatus 4 configured as shown in FIG. 1, the present invention is not limited thereto, and the present invention can be broadly applied to storage apparatuses of various other configurations that are equipped with a hierarchy control function.

Moreover, while the foregoing embodiment explained a case of configuring the storage hierarchies from the three hierarchies of the first to third storage hierarchies, the present invention is not limited thereto, and the present invention can also be applied to a two-hierarchy configuration or a configuration of four hierarchies or more.

In addition, while the foregoing embodiment explained a case of preparing and using the first and second access frequency thresholds Ia, Ib and the first and second high-side access frequency thresholds Iah, Ibm, and the first and second low-side access frequency thresholds Iam, Ibl as the thresholds to be used upon determining the proper storage hierarchy as the placement destination of data written in a virtual page of the virtual volume, the present invention is not limited thereto, and, in order to simply management, it is also possible to determine the proper storage hierarchy as the placement destination of data written in the virtual page of the virtual volume VVOL by only using the first and second access frequency thresholds Ia, Ib; that is, without using the first and second high-side access frequency thresholds Iah, Ibm and the first and second low-side access frequency thresholds Iam, Ibl.

However, in the foregoing case, the threshold for determining the appropriate placement destination of data stored in the temporary storage area (H3, M3, L3) of a lower-level storage hierarchy as the long-term storage area (H2, M2, L2) of a higher-level storage hierarchy and the threshold for determining the appropriate placement destination of data stored in the temporary storage area of a higher-level storage hierarchy as the long-term storage area of a lower will be the same value (first and second access frequency thresholds Ia, Ib) between two consecutive storage hierarchies, and there is a problem in that this will consequently result in the frequent relocation of data, and increase the load of the controller 22 (FIG. 1) of the storage apparatus 4.

Thus, from this perspective, as a result of providing the first and second high-side access frequency thresholds Iah, Ibm and the first and second low-side access frequency thresholds Iam, Ibl in addition to the first and second access frequency thresholds Ia, Ib as in this embodiment, the threshold for determining the proper placement destination of the data stored in the temporary storage area of the storage hierarchy of a lower level as the long-term storage area of the storage hierarchy of a higher level and the threshold for determining the proper placement destination of the data stored in the temporary storage area of the storage hierarchy of a higher level as the long-term storage area of the storage hierarchy of a lower level can be set to be different values between two consecutive storage hierarchies, and it is thereby possible to yield the effect of reducing the load of the controller 22 of the storage apparatus 4.

In addition, while the foregoing embodiment explained a case of enabling the setting of fixing data in a specific storage hierarchy in data units, the present invention is not limited thereto, and, for example, the storage apparatus 4 may be configured so that the setting may be performed in virtual volume VVOL units or in virtual page units.

Furthermore, while the foregoing embodiment explained a case of executing the determination processing (processing explained above with reference to FIG. 13B) of determining the proper storage hierarchy as the placement destination of data placed in the temporary storage area (H3, M3, L3) of the respective storage hierarchies at the same timing as the determination processing (processing explained above with reference to FIG. 13A) of determining the proper storage hierarchy as the placement destination of data placed in the long-term storage area (H2, M2, L2) of the respective storage hierarchies, the present invention is not limited thereto, and, for example, the determination processing explained above with reference to FIG. 13A (or the determination processing explained above with reference to FIG. 13A and the determination processing explained above with reference to FIG. 13B) and the determination processing explained above with reference to FIG. 13B may be executed at a different timing. For example, the determination processing explained above with reference to FIG. 13A (or FIG. 13A and FIG. 13B) and the relocation processing explained above with reference to FIG. 14 to be executed subsequently may be executed in the Y time cycle or at a different timing, and the determination processing explained above with reference to FIG. 13B and the relocation processing explained above with reference to FIG. 14 may be executed in a separate cycle (for example, Z time cycle) or timing.

In addition, while the foregoing embodiment explained a case of configuring the access for measuring the access frequency of each of the plurality of measurement cycles for each of the virtual pages VP in the virtual volume VVOL, the hierarchy determination unit for determining, based on the measurement result of the access frequency measurement unit, the storage hierarchy which is proper as a placement destination of the data written in each of the virtual pages VP of the virtual volume VVOL, and the relocation unit for relocating, with respect to the virtual page VP among each of the virtual pages VP of the virtual volume VVOL in which the storage hierarchy to which belongs the storage area storing the data written in that virtual page VP differs from the storage hierarchy that was determined as being proper as the placement destination of that data by the hierarchy determination unit, the data written in that virtual page VP to the storage area to which belongs the storage hierarchy that was determined as being proper by the hierarchy determination unit from the CPU 31 (FIG. 1) which governs the operational control of the overall storage apparatus 4, the present invention is not limited thereto, and the access frequency measurement unit, the hierarchy determination unit and the relocation unit may also be configured from a dedicated CPU or the like other than the foregoing CPU 31.

INDUSTRIAL APPLICABILITY

The present invention can be applied to a storage apparatus that is equipped with a hierarchy control function.

REFERENCE SIGNS LIST

1 . . . computer system, 3 . . . business server, 4 . . . storage apparatus, 22 . . . controller, 30 . . . storage device, 31 . . . CPU, 32 . . . memory, 36 . . . management device, VOL . . . logical volume, VVOL . . . virtual volume, PL . . . logical page, PP . . . physical page, VP . . . virtual page, PL . . . pool, H1, M1, L1 . . . fixed storage area, H2, M2, L2 . . . long-term storage area, H3, M3, L3 . . . temporary storage area, X, Y, Z . . . time, Ia . . . first access frequency threshold, Iah . . . first high-side access frequency threshold, Iam . . . first low-side access frequency threshold, Ib . . . second access frequency threshold, Ibh . . . second high-side access frequency threshold, Ibm . . . second low-side access frequency threshold, 40 . . . page management table, 41 . . . hierarchy management table.

The invention claimed is:

1. A storage apparatus coupled to a host computer, the storage apparatus comprising:

a plurality of storage devices configured with a plurality of storage tiers including a first tier corresponding to storage devices with high performance, a second tier corresponding to storage devices with middle performance, and a third tier corresponding to storage devices with low performance; and a controller configured to:

define two levels of storage areas in each of the plurality of storage tiers, which correspond to a long-term storage area and a short-term storage area, provide a virtual volume including a plurality of virtual areas to the host computer;

allocate a page from a pool of the plurality of storage devices to a certain virtual area of the plurality of the virtual areas according to a write request from the host computer dynamically;

upon allocating a page, determine one of the plurality of storage tiers from the first tier, the second tier, or the third tier and the long-term storage area or the short-term storage area in the determined storage tier as an appropriate storage tier and a storage area, by comparing two access frequencies on a basis of virtual area of the plurality of virtual areas with a plurality of thresholds, in which the two access frequencies are measured as a long-term access frequency and a short-term access frequency;

reallocate the page by migrating data corresponding to the virtual area from a current page belonging to a current storage tier and storage area to a new page belonging to the appropriate storage tier and storage area, if the appropriate storage tier and storage area is different from the current storage tier and storage area, wherein the controller is configured to:

determine whether the virtual area corresponds to the long-term storage area in any of the first, second, or third storage tiers, if the determination is positive, compare the long-term access frequency of the virtual area with a first threshold of the plurality of thresholds, if the long-term access frequency of the virtual area is larger than the first threshold, compare the short-term access frequency of the virtual area with a second threshold of the plurality of thresholds, if the short-term access frequency of the virtual area is larger than the second threshold, determine the long-term storage area of the first storage tier as the appropriate storage tier and the storage area.

2. The storage apparatus according to claim 1, wherein, if the short-term access frequency of the virtual area is smaller than the second threshold, the controller is configured to determine the short-term storage area of the second storage tier as the appropriate storage tier and the storage area.

3. The storage apparatus according to claim 1, wherein the controller is configured to:

if the long-term access frequency of the virtual area is smaller than the first threshold, compare the long-term access frequency of the virtual area with a third threshold of the plurality of thresholds, if the long-term access frequency of the virtual area is larger than the third threshold, compare the short-term access frequency of the virtual area with a fourth threshold of the plurality of thresholds, if the short-term access frequency of the virtual area is larger than the fourth threshold, determine the short-term storage area of the first storage tier as the appropriate storage tier and the storage area.

4. The storage apparatus according to claim 3,
wherein the controller is configured to:
if the long-term access frequency of the virtual area is smaller than the third threshold, compare the short-term access frequency of the virtual area with a sixth threshold of the plurality of thresholds,
if the short-term access frequency of the virtual area is larger than the sixth threshold, determine the short-term storage area of the second storage tier as the appropriate storage tier and the storage area.

5. The storage apparatus according to claim 4,
wherein, if the short-term access frequency of the virtual area is smaller than the sixth threshold, the controller is configured to determine the long-term storage area of the third storage tier as the appropriate storage tier and the storage area.

6. The storage apparatus according to claim 3,
wherein the controller is configured to:
if the long-term access frequency of the virtual area is smaller than the first threshold, compare the long-term access frequency of the virtual area with the third threshold of the plurality of thresholds,
if the long-term access frequency of the virtual area is larger than the third threshold, compare the short-term access frequency of the virtual area with a fourth threshold of the plurality of thresholds,
if the short-term access frequency of the virtual area is smaller than the fourth threshold, compare the short-term access frequency of the virtual area with a fifth threshold of the plurality of thresholds,
if the short-term access frequency of the virtual area is larger than the fifth threshold, determine the long-term storage area of the second storage tier as the appropriate storage tier and the storage area.

7. The storage apparatus according to claim 6,
wherein, if the short-term access frequency of the virtual area is smaller than the fifth threshold, the controller is configured to determine the short-term storage area of the third storage tier as the appropriate storage tier and the storage area.

8. A storage apparatus coupled to a host computer, the storage apparatus comprising:
a plurality of storage devices configured with a plurality of storage tiers including a first tier corresponding to storage devices with high performance, a second tier corresponding to storage devices with middle performance, and a third tier corresponding to storage devices with low performance; and
a controller configured to:
define two levels of storage areas in each of the plurality of storage tiers, which correspond to a long-term storage area and a short-term storage area,
provide a virtual volume including a plurality of virtual areas to the host computer;
allocate a page from a pool of the plurality of storage devices to a certain virtual area of the plurality of the virtual areas according to a write request from the host computer dynamically;
upon allocating a page, determine one of the plurality of storage tiers from the first tier, the second tier, or the third tier and the long-term storage area or the short-term storage area in the determined storage tier as an appropriate storage tier and a storage area, by comparing two access frequencies on a basis of virtual area of the plurality of virtual areas with a plurality of thresholds, in which the two access frequencies are measured as a long-term access frequency and a short-term access frequency;
reallocate the page by migrating data corresponding to the virtual area from a current page belonging to a current storage tier and storage area to a new page belonging to the appropriate storage tier and storage area, if the appropriate storage tier and storage area is different from the current storage tier and storage area,
wherein the controller is further configured to measure a middle-term access frequency on a basis of virtual area,
wherein the controller is configured to determine whether the virtual area corresponds to the long-term storage area in any of the first, second, or third storage tiers,
wherein, if the determination is negative, the controller is configured to determine whether the virtual area corresponds to the short-term storage area in the first storage tiers,
wherein, if the determination is positive, the controller is configured to compare the middle-term access frequency of the virtual area with a seventh threshold of the plurality of thresholds,
wherein, if the middle-term access frequency of the virtual area is larger than the seventh threshold, the controller is configured to determine the long-term storage area of the first storage tier as the appropriate storage tier and the storage area.

9. The storage apparatus according to claim 8,
wherein, if the middle-term access frequency of the virtual area is smaller than the seventh threshold, the controller is configured to determine the long-term storage area of the second storage tier as the appropriate storage tier and the storage area.

10. The storage apparatus according to claim 8,
wherein the controller is configured to determine whether the virtual area corresponds to the short-term storage area in the first storage tiers,
wherein, if the determination is negative, the controller is configured to determine whether the virtual area corresponds to the short-term storage area in the second storage tiers,
wherein, lithe determination is positive, the controller is configured to compare the middle-term access frequency of the virtual area with an eighth threshold of the plurality of thresholds,
wherein, if the middle-term access frequency of the virtual area is larger than the eighth threshold, the controller is configured to determine the long-term storage area of the first storage tier as the appropriate storage tier and the storage area.

11. The storage apparatus according to claim 10,
wherein, lithe middle-term access frequency of the virtual area is smaller than the eighth threshold, the controller is configured to compare the middle-term access frequency of the virtual area with a ninth threshold of the plurality of thresholds,
wherein, if the middle-term access frequency of the virtual area is larger than the ninth threshold,
the controller is configured to determine the long-term storage area of the second storage tier as the appropriate storage tier and the storage area.

12. The storage apparatus according to claim 11,
wherein, if the middle-term access frequency of the virtual area is smaller than the ninth threshold, the controller is configured to determine the long-term storage area of the third storage tier as the appropriate storage tier and the storage area.

13. The storage apparatus according to claim 10,
wherein the controller is configured to determine whether the virtual area corresponds to the short-term storage area in the second storage tiers,
wherein, if the determination is negative, the controller is configured to compare the middle-term access frequency of the virtual area with a tenth threshold of the plurality of thresholds,
wherein, if the middle-term access frequency of the virtual area is larger than the tenth threshold, the controller is configured to determine the long-term storage area of the second storage tier as the appropriate storage tier and the storage area.

14. The storage apparatus according to claim 13,
wherein, if the middle-term access frequency of the virtual area is smaller than the tenth threshold, the controller is configured to determine the long-term storage area of the third storage tier as the appropriate storage tier and the storage area.

15. A storage apparatus coupled to a host computer, the storage apparatus comprising:
a plurality of storage devices configured with a plurality of storage tiers including a first tier corresponding to storage devices with high performance, a second tier corresponding to storage devices with middle performance, and a third tier corresponding to storage devices with low performance; and
a controller configured to:
define two levels of storage areas in each of the plurality of storage tiers, which correspond to a long-term storage area and a short-term storage area,
provide a virtual volume including a plurality of virtual areas to the host computer;
allocate a page from a pool of the plurality of storage devices to a certain virtual area of the plurality of the virtual areas according to a write request from the host computer dynamically;
upon allocating a page, determine one of the plurality of storage tiers from the first tier, the second tier, or the third tier and the long-term storage area or the short-term storage area in the determined storage tier as an appropriate storage tier and a storage area, by comparing two access frequencies on a basis of virtual area of the plurality of virtual areas with a plurality of thresholds, in which the two access frequencies are measured as a long-term access frequency and a short-term access frequency;
reallocate the page by migrating data corresponding to the virtual area from a current page belonging to a current storage tier and storage area to a new page belonging to the appropriate storage tier and storage area, if the appropriate storage tier and storage area is different from the current storage tier and storage area,
wherein the controller is further configured to define a fixed storage area other than the long-term storage area and the short-term storage area in each of the storage tiers, and allocate a page to the fixed storage area in any of the storage tiers based on user instruction.

* * * * *